United States Patent [19]

Sevitsky et al.

[11] Patent Number: 4,621,350
[45] Date of Patent: Nov. 4, 1986

[54] RECORDING AND DICTATION SYSTEM

[75] Inventors: Gary S. Sevitsky, Bayside, N.Y.;
Kevin L. Short, Bridgeport; Robert T. Paulson, Trumbull, both of Conn.

[73] Assignee: Dictaphone Corporation, Rye, N.Y.

[21] Appl. No.: 496,408

[22] Filed: May 20, 1983

[51] Int. Cl.⁴ ............................................. G11B 19/02
[52] U.S. Cl. ........................................ 369/29; 369/24; 369/25; 369/30
[58] Field of Search ................. 340/825.5; 369/24, 25, 369/29, 30; 179/6.07, 6.09, 6.17

[56] References Cited

U.S. PATENT DOCUMENTS

| | | | |
|---|---|---|---|
| 4,221,938 | 9/1980 | Mohammadioun et al. | 179/6.09 X |
| 4,254,307 | 3/1981 | Plunkett, Jr. | 369/26 |
| 4,319,337 | 3/1982 | Sander et al. | 364/900 |
| 4,332,021 | 5/1982 | Plunkett, Jr. | 369/29 |
| 4,392,218 | 7/1983 | Plunkett, Jr. | 369/29 |

Primary Examiner—Robert L. Richardson
Attorney, Agent, or Firm—Curtis, Morris & Safford

[57] ABSTRACT

Apparatus for connecting at least one recovery station to preselected ones of plural recorders in an information processing system to recover information jobs from those recorders. Indications of those preselected recorders to which the recovery station is to be connected are stored. Depending upon the criteria on which the recovery station is to be connected to the recorders (e.g. backlog of information jobs awaiting recovery or predetermined sequence), the appropriate one of the recorders is selected and connected to the recovery station. Upon completing the recovery of information jobs from the connected recorder, the next of the preselected recorders is selected in accordance with the aforementioned criteria.

Although the recovery station may be connected to recover all of the information jobs in a recorder, apparatus for monitoring and storing data related to those information jobs, including the status thereof, indicates that only the information job which is in the process of recovery is "assigned" to that recovery station, while the remaining jobs which await recovery merely are "ready" to be assigned.

34 Claims, 7 Drawing Figures

S-9%  A-5% BACKLOG = 205  TURNAROUND = 0.2  RATE = 800    OCT 83   28/08:14

RECORDER ASSIGN: TRANSCRIBER ?    DONE

| TR | PREASSIGNED TANKS | | | | ASSIGN TANKS BY BACKLOG? | ASSIGN ONLY BEFORE TIME IN |
|---|---|---|---|---|---|---|
| 1  | R3  | R4 |    |    | NO  | NO |
| 2  | R1P | R2 |    |    | NO  | OCT 12/11:15 |
| 3  | R1  | R2 | R3 | R4 | YES | NO |
| 4  | R2  | R1 |    |    | YES | SEP 30/15:00 |
| 5  |     |    |    |    | NO  | NO |
| 6  |     |    |    |    | NO  | NO |
| 7  |     |    |    |    | NO  | NO |
| 8  |     |    |    |    | NO  | NO |
| 9  |     |    |    |    | NO  | NO |
| 10 |     |    |    |    | NO  | NO |
| 11 |     |    |    |    | NO  | NO |
| 12 |     |    |    |    | NO  | NO |

FIG. 2

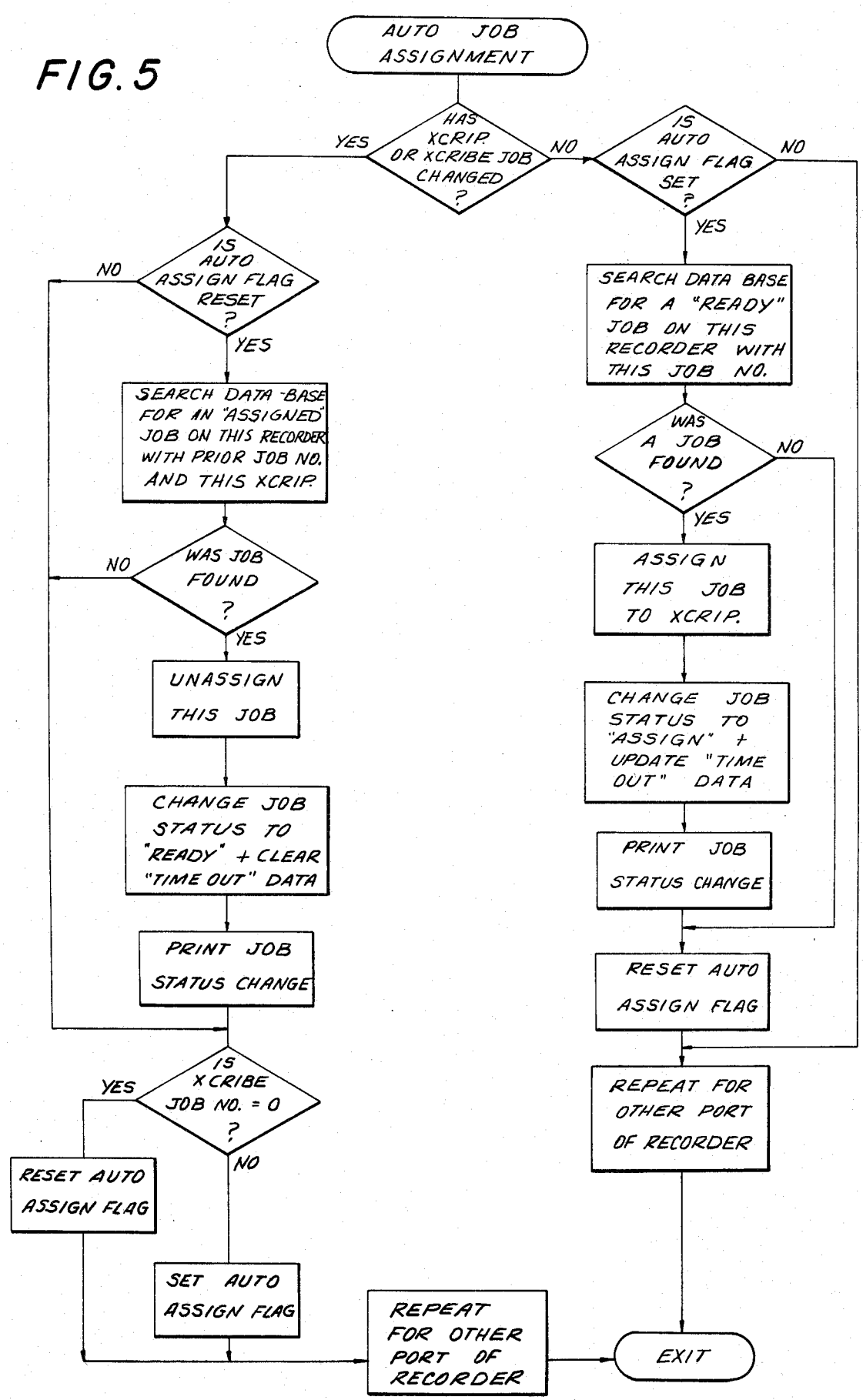

RECORDING AND DICTATION SYSTEM

BACKGROUND OF THE INVENTION

This invention relates to apparatus for connecting at least one recovery station to preselected recorders, in succession, to recover information jobs from those recorders and, more particularly, to such apparatus which is useful in an information processing system, such as a central dictation system, whereby information jobs that are recorded on several recorders may be recovered therefrom by a particular recovery station, such as a transcribe station, which switches from one to the next recorder automatically. The present invention also relates to apparatus for monitoring and storing data related to the information jobs, or messages, recorded on each recorder and, more particularly, to such apparatus which indicates that only a single one of several information jobs, or messages, is "assigned" to the recovery, or transcribe, station connected to that recorder.

This invention is related to the system disclosed and claimed in U.S. Pat. No. 4,319,337, issued to the assignee of the present invention. The present invention also is related to the monitoring and displaying apparatus described in copending application Ser. No. 496,654, filed May 20, 1983.

In a central information processing system, such as a central dictation system, information originating from several originating stations is processed, or recorded, by individual processing devices or recorders for further use. Recovery stations, such as transcribe stations, are connectable to the individual processing devices in order to recover the information therefrom.

In a central dictation system, it has been the practice heretofore of connecting an individual transcribe station to a particular recorder for the transcription of dictated messages. After all, or at least selected ones, of the dictated messages are transcribed, the transcribe station remains idle until additional messages are recorded. As an alternative, and to improve the efficiency of transcription in such a central dictation system, each transcribe station may be manually disconnected from one recorder and then connected to another such that the transcriptionist may transcribe additional messages from the other recorder. Typically, the transcribe station is provided with a suitable plug that is inserted into a compatible socket on the recorder. This plug-socket connection thus provides suitable paths for control signals and audio information, whereby the operation of the recorder may be controlled and the dictated messages may be played back and perceived by the transcriptionist.

A major disadvantage of the central dictation system described above is the requirement of a manual interconnection between a particular transcribe station and desired ones of the recorders. To effect change-overs in such connections, the transcribe station must be physically disposed in close proximity to the recorders or, alternatively, a supervisory operator must be present in order to disconnect the transcribe station from one recorder and to connect it to another. Furthermore, suitable communication must be established between the transcriptionist and the supervisory operator in order to apprise the latter when it is necessary to change-over the connection to the recorder.

The aforementioned difficulty is compounded when it is desirable, or even necessary, to locate transcribe stations remotely from the recorders. For example, such change-overs in the connections between the transcribe station and the recorders is made more difficult if the communication path therebetween includes a telephone line.

While automatic switching apparatus generally is known, it is desirable, in the environment of an information processing system, to control that apparatus in various different modes. For example, it may be desirable to select recorders, at random, to which the transcribe station is to be connected, but the successive connections should be in a predetermined order. Also, it would be advantageous to permit a supervisory operator to substitute different recorders for those which had been selected and, additionally, to modify the order in which the transcribe station is connected to those recorders. This would facilitate unattended change-over operations and provide the transcriptionist with a "full schedule" of work. Hence, after-hour transcription could be accomplished with minimum personnel, thus improving the overall cost of the transcribing operation.

Another difficulty in controlling automatic switching equipment resides in different criteria which may be established for change-over connections. For example, it may be desirable to connect the transcribe station to the different recorders in an order determined by the "backlog" of messages awaiting transcription in each recorder. One type of recorder that typically is found in a central dictation system is the endless-loop recorder of the type described in U.S. Pat. No. 3,817,436. In this recorder, separate dictate and transcribe ports are provided so as to permit dictation to proceed while, simultaneously, the previously dictated messages may be transcribed. In such a recorder, the backlog of messages awaiting transcription may change and may even increase while messages are being transcribed. Thus, since the backlog of endless-loop recorders may change dynamically, the determination of which recorder exhibits the greatest backlog so as to be connected to the transcribe station presents some difficulty in controlling the switching apparatus.

Still further, in central dictation systems having a high level of activity, it is possible that messages may not be transcribed for a substantial period of time. It may be desirable, therefore, to control the switching apparatus to connect the transcribe stations successively to different recorders in order to transcribe such old messages. Here too, it is difficult to control the switching apparatus to insure that old messages, that is, those messages that had been recorded prior to some predetermined time, are transcribed promptly. That is, it is difficult to control the switching apparatus so as to connect the transcribe station to one recorder for transcribing all old messages therein, and then to another recorder for transcribing the old messages, and so on.

Yet another difficulty associated with central dictation systems having endless-loop recorders is the ability to assign separate messages within a recorder, one message at a time, to a transcriptionist for transcription. For example, in the monitoring and displaying system described in U.S. Pat. No. 4,319,337, all of the dictated messages which are awaiting transcription in an endless-loop recorder are designated as being "assigned" to the particular transcribe station (or transcriptionist) which then is connected to the recorder. Data, referred to as "job records", relating to the messages which are recorded on this recorder are provided with "assigned"

status, thereby designating all of such messages as being assigned for transcription by that transcriptionist. Inquiries by the supervisory operator as to those messages will be answered, in part, with the indication that those messages have been assigned to a particular transcriptionist. However, if the transcriptionist is unable to complete transcribing all of those messages or, alternatively, if another transcriptionist is connected to the recorder, the job record data relating to those untranscribed messages, and particularly the "assigned" status designation, may not be updated. Hence, erroneous information may be provided the supervisory operator in response to inquiries relating to those messages.

Notwithstanding the aforementioned disadvantage, it has not been provided heretofore merely to assign a message on an endless-loop recorder to a particular transcriptionist when and only when that message is in the process of being transcribed. Rather, it has been the practice to assign all messages on that recorder to the transcriptionist, even though some of those messages may never be transcribed thereby.

OBJECTS OF THE INVENTION

Therefore, it is an object of the present invention to provide improved apparatus which overcomes the aforenoted disadvantages and difficulties attending information processing systems, and particularly central dictation systems.

Another object of this invention is to provide apparatus for connecting a recovery station of an information processing system to preselected ones of information recorders on a recorder-by-recorder basis.

A further object of this invention is to provide apparatus for successively connecting a transcribe station to preselected recorders to transcribe messages that have been dictated thereon, in accordance with preselected criteria.

An additional object of this invention is to provide apparatus of the aforementioned type wherein the transcribe station is connected from recorder to recorder as a function of the backlog of messages in each recorder awaiting transcription.

Yet another object of this invention is to provide apparatus of the aforementioned type wherein a transcribe station is connected successively to recorders in accordance with a preestablished sequence.

Yet a further object of this invention is to provide unattended apparatus which automatically switches a transcribe station from one recorder to the next in accordance with preestablished criteria, upon the completion of transcription of messages from the first recorder.

It is another object of this invention to provide apparatus for monitoring and storing job record data related to information jobs which are recorded on plural recorders and for designating an "assigned" status only to the particular information job then being recovered from a recorder by a recovery station connected thereto.

An additional object of this invention is to provide apparatus for monitoring and storing the status of several messages recorded on a record medium, and designating only the message then being transcribed as an "assigned" message.

Another object of this invention is to provide apparatus of the aforementioned type which changes over the status of a message from "assigned" to "ready" when a different message is transcribed without first completing transcription of the previous message.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for connecting at least one recovery station, such as a transcribe station, successively to preselected ones of recorders in an information processing system, such as a central dictation system, to recover, or transcribe, information jobs, or messages, therefrom. The apparatus includes a store for storing indications of those preselected recorders to which the recovery station is to be connected. Criteria for connecting the recovery station to the preselected recorders are established, and the appropriate recorder is selected in accordance with such criteria. The recovery station is connected to the selected recorder; and, upon the completed recovery of information jobs from that recorder, the next recorder that satisfies the criteria is selected for connection.

In accordance with one aspect of this invention, the criteria on which the recovery, or transcribe, station is connected to a recorder is based upon which of the preselected recorders has the greatest backlog of information jobs, or messages, awaiting recovery. Alternatively, the criteria for connection is based upon the sequence in which the recorders have been preselected. Advantageously, manually operable means, such as a keyboard or other switches, is provided for preselecting, in advance, the particular recorders to which the recovery station is to be connected.

It is a feature of this invention to provide means by which the greatest backlog is determined for the preselected recorders. Another feature of this invention is the means by which the next recorder is selected for connection after the information jobs, or messages, have been recovered from the preceding recorder.

Yet another feature of this invention is to recover, or transcribe, only those information jobs, or messages, which satisfy predetermined characteristics. For example, in the environment of a central dictation system, only those messages which have been entered into the central dictation system prior to, for instance, a predetermined time, are transcribed. After all such messages are transcribed from one recorder, the transcribe station is connected automatically to the next.

In accordance with another aspect of this invention, apparatus is provided for monitoring and storing data, and particularly status data, related to the information jobs, or messages, which are recorded on and recovered, or transcribed, from a recorder. The "ready" status designates those information jobs, or messages, which have been recorded and are ready to be assigned to a recovery station; the "assigned" status designates the information job, or message, which has been assigned to a recovery station; and the "completed" status designates those information jobs, or messages, which have been completely recovered, or transcribed. When a fresh information job is positioned in the recorder for recovery, only that job is designated as "assigned", even though several other jobs remain therein to be recovered.

The foregoing aspect, in the environment of a central dictation system, overcomes the aforementioned disadvantage attending prior art monitoring systems wherein all of the messages that had been recorded on a particular recorder had been designated as "assigned" when a transcribe station was connected to that recorder. In the present invention, only the message which is being transcribed is designated as "assigned". The remaining messages which await transcription retain the "ready" designation.

A feature of this aspect of the invention is to change over the designation of a message from "assigned" to "ready" when the next message is positioned for transcription prior to the complete transcription of the previous message.

BRIEF DESCRIPTION OF THE DRAWINGS

The following detailed description, given by way of example, will best be understood in conjunction with the accompanying drawings in which:

FIG. 2 represents an example of a display of a typical recorder preassignment selection;

FIG. 5 is a flow chart representing the operation of another aspect of this invention.

DETAILED DESCRIPTION OF CERTAIN PREFERRED EMBODIMENTS

The present invention now will be described in the environment of a central dictation system. However, it will be readily appreciated by those of ordinary skill in the art that this invention pertains to information processing systems in general, and particularly of the type having recorders in which information derived from originating stations is recorded and from which the recorded information subsequently may be recovered. In the context of a central dictation system, such originating stations are dictate stations and the recovery stations are best recognized as transcribe stations. The recorders may utilize a movable magnetic medium, such as tape or discs, a dynamic medium, such as bubble memory devices, or conventional static storage means.

Figure 1:
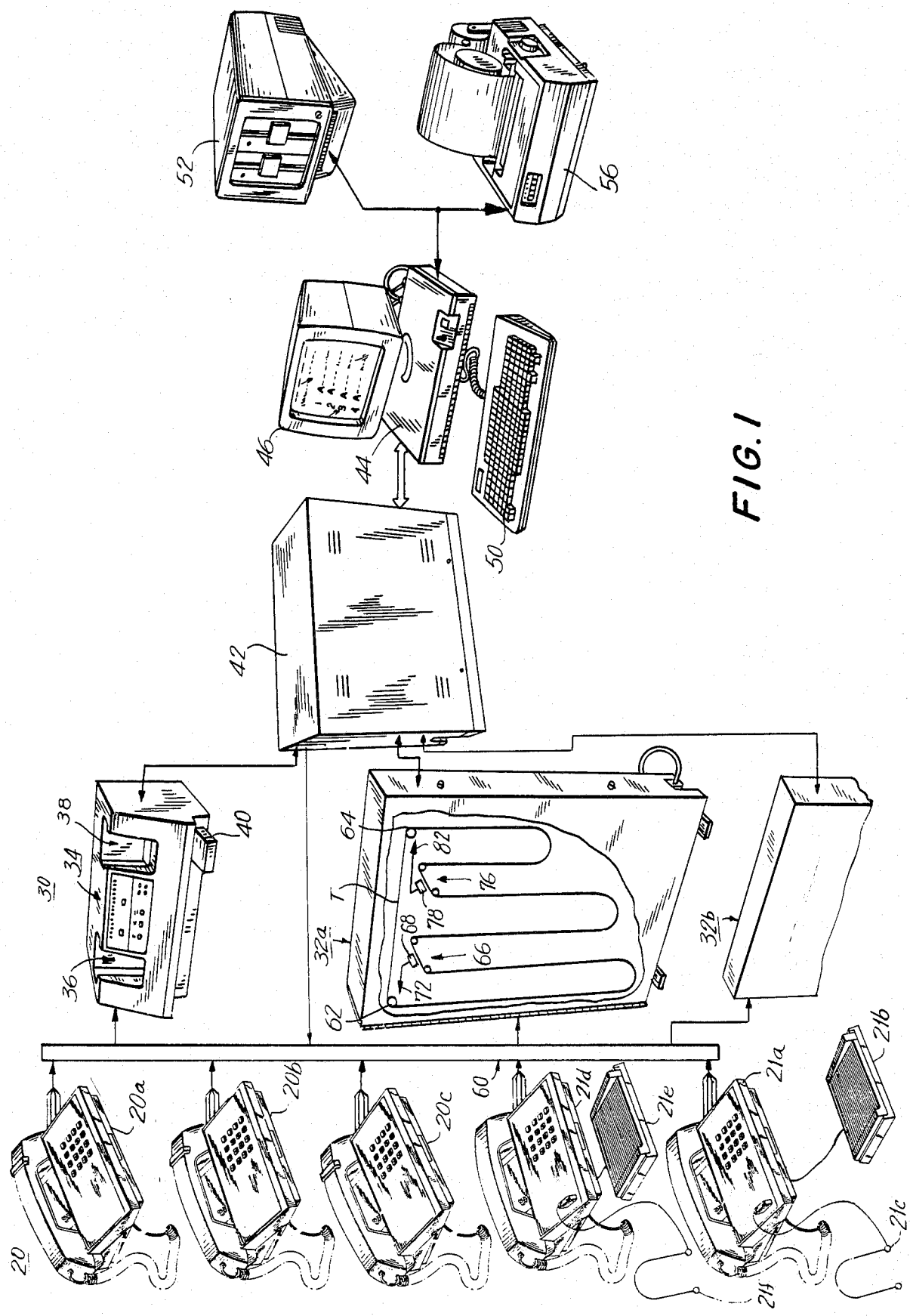
FIG. 1 is a system diagram representing the information processing system with which the apparatus of the present invention is used.

Referring to FIG. 1, the central dictation system with which the present invention finds ready application is comprised of a plurality of recorders 30, each being selectively connectable by way of conventional switching circuits, such as switching matrix 60, to be seized by any one of several dictate stations 20 for receiving and recording dictated messages. Preferably, one or more of the recorders may be comprised of an endless-loop recorder, such as endless-loop recorders 32a and 32b, of the type described in U.S. Pat. No. 3,817,436. Also included in recorders 30 is one or more recorder-changers 34 which may be of the type described in U.S. Pat. No. 4,092,679. Endless-loop recorders 32a and 32b are each coupled by a respective 4-wire cable to switching matrix 60 which, in turn, is connected to the usual 4-wire private-wire connection of each of plural dictate stations 20a, 20b and 20c. For illustrative purposes only, three dictate stations have been shown. It will be readily appreciated, however, that any desired number of dictate stations, generally many more than three, may be used with the illustrated recorders.

As is known from aforementioned U.S. Pat. No. 3,817,436, a typical endless-loop recorder, such as recorder 32a, includes a dictate port 66 and a transcribe port 76. An endless loop of tape T is transported from dictate port 66, whereat dictated messages are recorded thereon, through serpentine folds to transcribe port 76, whereat the previously recorded dictated messages are transcribed. To this effect, a record head 68 is provided at dictate port 66 and a transcribe head 78 is provided at transcribe port 76. As will also be appreciated, each head functions as a conventional magnetic transducer and is capable of recording audio signals on tape T and also of reproducing audio signals from the tape. Head 68 at dictate port 66 is coupled by connection 72 to a suitable audio input/output circuit for recording or reproducing audio signals from the tape. Likewise, head 78 at transcribe port 76 is coupled via connection 82 to a suitable audio input/output circuit.

During normal operation, head 68 of dictate port 66 in the endless-loop recorder is coupled at connection 72 to a respective one of dictate stations 20a-20c via switching matrix 60. Also, head 78 at transcribe port 76 is coupled via switching matrix 60 and connection 82 to a transcribe station, such as one of transcribe stations 21a or 21d, to permit the transcription of previously recorded dictated messages. Although only two transcribe stations are illustrated in FIG. 1, it will be appreciated that each of recorders 32a and 32b may be selectively connected to any one of several such transcribe stations by means of the switching matrix. Since separate dictate and transcribe ports are provided in the endless-loop recorder, it is appreciated that dictation and transcription may proceed simultaneously.

In an embodiment to be described below, an endless-loop recorder may enable the "priority" transcription of messages. To effect such priority transcription, transcribe station 21a, for example, may be connected by switching matrix 60 directly to dictate port 66 of recorder 32a, thus permitting the transcription of messages immediately without requiring those messages to be transported through the aforementioned serpentine folds to transcribe port 76. Of course, when a transcribe station is connected to dictate port 66, new messages cannot be recorded on tape T of the endless-loop recorder. Each endless-loop recorder produces suitable output signals indicating the connection thereto of a dictate station or a transcribe station, and the particular port to which the transcribe station is connected.

As tape is moved through the endless-loop recorder, signals analogous to timing signals are generated to indicate the length of tape that is transported past dictate port 66 and also to indicate the length of tape that is transported past transcribe port 76. By accumulating such count signals, a count may be derived representing the length of tape that has been transported past the dictate port, that is, the length of tape consumed by dictated messages, and also the length of tape that has been transported past the transcribe port, that is, the length of transcribed messages. Reference is made to U.S. Pat. No. 3,965,484 for a description of illustrative tape-length sensing apparatus. It is recognized that the difference between these counts represents the overall length of messages that is awaiting transcription.

Each endless-loop recorder functions in the usual manner in response to dictate control signals generated at the dictate station which has seized the recorder to advance tape T, rewind that tape, play back messages from the tape, record messages thereon and generate end-of-message signals. Typically, an end-of-message signal represents the end of a dictated message; and a count of such end-of-message signals represents the number of messages that have been recorded. A similar count of end-of-message signals sensed at transcribe port 76 is indicative of the number of messages that have been transcribed. It is recognized that the difference between these counts represents the number of messages awaiting transcription and, moreover, these respective counts are used, as will be described below, to identify those messages which have been transported to the dictate and/or transcribe ports.

Transcribe stations 21a and 21d are substantially identical. As illustrated in FIG. 1, transcribe station 21a, for example, includes a foot pedal 21b and a headset 21c connected thereto. As is conventional, the operation of foot pedal 21b serves to command the forward and reverse movement of tape T to permit previously recorded messages thereon to be reproduced through headset 21c. Since this feature is conventional and forms no part of the present invention per se, further description of the transcribe station and the manner in which it cooperates with the endless-loop recorders will not be provided.

Recorder-changer 34 may be of the type described in U.S. Pat. No. 4,092,679. This recorder-changer is coupled to dictate stations 20a–20c by switching matrix 60. Recorder 34 is adapted to record messages on individual record media, such as tape cartridges or cassettes. In the preferred embodiment, recorder 34 includes a supply bin 36 in which a stack of fresh magnetic cassettes is stored, an output bin 38 to which cassettes having messages recorded thereon are transported, and a priority eject bin 40 to which cassettes having priority messages recorded thereon are ejected. A record station (not shown) is provided intermediate supply bin 36 and output bin 38. The record station receives a fresh cassette from the supply bin and records messages thereon from the particular dictate station that is connected to recorder-changer 34. When a sufficient number of messages have been recorded, as will be described below, the cassette is removed, or ejected, from the recorder to output bin 38. In the event that the messages recorded on the particular cassette have a high priority of transcription, the cassette is diverted from output bin 38 to priority bin 40. This cassette then may be transcribed promptly.

As is appreciated, in the illustrated embodiment, recorder-changer 34 functions only as a recording device and does not exhibit transcription capabilities. Preferably, after a cassette has been recorded and removed to output bin 38, the cassette is played back by a transcriptionist using a so-called desk-top transcribing machine.

During a recording operation, the cassette tape is transported, and suitable counting means (not shown) included in recorder-changer 34 generate count signals representing the length of tape consumed by messages. Also, it is contemplated that a particular cassette will receive messages from several dictate stations. A so-called seizure counter is included in recorder-changer 34 to count the number of seizure connections made to the recorder-changer by the various dictate stations. A count representing such seizures also is produced. Further, the recorder-changer produces timing signals representing the duration of time that has passed since the initial seizure and recording of a message on a fresh cassette.

The recorder-changer also includes manually settable switches by which preset conditions may be established for controlling the subsequent removal or ejection of a cassette from the record station. For example, one of these switches operates to preset a length of tape which, when consumed by messages, results in the removal or ejection of the cassette. Another one of these switches operates to preset the number of seizure connections to recorder-changer 34 for recording messages on a single cassette. Once this preset number of seizures has been made, the cassette is ejected from the record station upon the next release of the recorder by the dictate station. A still further one of these switches operates to preset the time duration from an initial seizure for recording on a fresh cassette until that cassette is ejected. This serves to insure that a message will be transcribed from that cassette even if the cassette remains idle at the record station for a predetermined period of time. At the completion of the preset time duration, the cassette is ejected and the message may be transcribed.

Signals representing the foregoing preset conditions, as well as the signals representing the actual length of messages recorded on a cassette, the actual number of seizures that have been made to that cassette and the actual duration of time that has passed since an initial seizure to that cassette, are provided by recorder-changer 34.

Recorders 32a, 32b and 34, only three of which being illustrated in FIG. 1, are coupled by, for example, multi-wire cables, to a controller 42 which functions to sense the signals produced by the respective recorders (e.g. the signals representing seizure by a dictate station, connection of a transcribe station to a dictate or transcribe port, length of recorded messages, length of transcribed messages, length of messages awaiting transcription, number of dictated messages, number of transcribed messages, preset length of recording on a cassette prior to ejection, preset number of seizures to a recorder-changer prior to ejection, actual number of seizures for recording on a cassette, preset time duration from initial seizure to a cassette ejection, actual time duration from an initial seizure, and the like), to return control signals to switching matrix 60 or to the recorders, for example, to connect a particular transcribe station to a number of endless-loop recorders in succession, or to disconnect an inactive dictate station from a recorder.

Controller 42 is coupled to a processor 44 which operates in response to the aforementioned signals supplied to the controller to establish job records by which data relating to each dictated message is accumulated. For example, the data of a job record may designate the status of the message to which it is related (e.g. "ready" status when the message has been fully dictated and now is ready to be transcribed, "assigned" status when the message is in the process of being transcribed, and "completed" status when the message has been completely recovered), the identity of the dictate station from which the message was dictated, the identity of the recorder on which the message was recorded, the identity of the transcribe station that is assigned to transcribe the message, the times at which dictation was completed and at which transcription was assigned, and the length of the message. The data of the job record also may indicate if the message was recorded on a cassette and, if so, the identification of the cassette, or if the message was recorded on an endless tape, the number of that message on the tape.

Processor 44 cooperates with a display device 46, a keyboard 50 and a magnetic disc-drive mechanism 52 to monitor, store, modify and display the status and other job record data of various messages which are recorded and transcribed in the central dictation system. In this regard, processor 44, display device 46, keyboard 50 and disc-drive mechanism 52 may be similar to that described in aforementioned U.S. Pat. No. 4,319,337. Processor 44 also cooperates with a printer 56 for the purpose of printing data representing the job records which are assembled and stored by the processor in cooperation with the display, keyboard and disc-drive mechanism. In the interest of brevity, further description of these elements is not recorded; and an explanation thereof is found in U.S. Pat. No. 4,319,337, the disclosure of which is incorporated herein by reference.

In one embodiment, controller 42 is adapted to be coupled to up to eight recorders, any number of which may be formed as endless-loop recorders with the remainder, if any, being formed as recorder-changers. Of course, the teachings of the present invention are equally applicable to the connection of controller 42 to a lesser or greater number of recorders.

In operation, recorder 32a may be coupled to any one of several dictate stations 20a–20c and, likewise, recorder 32b as well as recorder-changer 34 may be coupled to respective dictate stations. As tape T advances in an endless-loop recorder, suitable counting apparatus included therein supplies signals to controller 42 representing the length of tape which is advanced past the respective dictate and transcribe ports. Preferably, although not necessarily, controller 42 includes circuitry or other means by which the difference between these counts is obtained, thus representing the "backlog" of tape which awaits transcription. It is recognized that other techniques may be used to represent "backlog". Similarly, recorder-changer 34 supplies count signals to the controller representing the amount of cassette tape which is advanced at the record station.

On completing a message, it is expected that the dictator will operate suitable switches at his dictate station to generate corresponding end-of-message signals. These signals are sensed by controller 42, for example, to increment a message or job counter, thereby representing the number of messages which have been recorded. With respect to an endless-loop recorder, suitable signals may be supplied from the port to which a transcribe station is connected to the controller in response to sensed end-of-message signals to represent the number of messages which have been transcribed. Advantageously, although not necessarily, controller 42 includes suitable circuitry or program-controlled means to obtain the difference between the numbers of messages which have been dictated and transcribed so as to produce a representation of the number of messages awaiting transcription. It will be appreciated that the controller thus may indicate when all of the messages in an endless-loop recorder have been transcribed. The signals are supplied by controller 42 to processor 44. In addition, the controller receives signals generated from, for example, a transcribe station representing that the transcriptionist has completely transcribed a message from an endless-loop recorder; and these signals also are supplied to processor 44.

Also, the controller supplies the processor with signals representing the identities of those transcribe stations which are connected to the endless-loop recorders. Such transcriber identifying signals may be generated manually by, for example, the operation of suitable push-buttons by the transcriptionists, or alternatively, such transcriber identifying signals may be generated automatically by the transcribe stations which are connected to the endless-loop recorders.

Controller 42 also functions to connect each transcribe station, such as transcribe station 21a, 21d, ..., to a number of endless-loop recorders, such as recorders 32a, 32b ..., in succession to transcribe all or selected messages from such recorders. The manner in which this is achieved will be discussed in greater detail hereinbelow. Suffice it to say that a number of recorders may be preselected for successive connection to a respective transcribe station, and the transcribe station may be advanced from one such recorder to the next either in sequence or as a function of the backlog present in each recorder. A supervisory operator may operate keyboard 50 to select those recorders to which each desired transcribe station should be connected. If sequential connection is desired, the recorders will be connected to the designated transcribe station in the same order that they are selected by the supervisory operator. Alternatively, if the connection between the transcribe station and the preselected recorders is determined by backlog, the sequence in which such recorders are selected by the supervisory operator has no affect upon the actual sequence in which those recorders are connected. As mentioned above, data relating to the backlog in each recorder is derived by, for example, controller 42; and signals representing such backlog are supplied from the controller to processor 44.

Still further, and as will be described in greater detail hereinbelow, controller 42 may operate, under the control of processor 44, to actuate switching matrix 60 to change over the connection of a transcribe station from one endless-loop recorder to the next after only selected messages have been completely transcribed. For example, in preselecting the recorders to which the transcribe station is to be connected, the condition that only those messages which have been entered into the central dictation system, e.g. those messages which have been dictated, prior to a predetermined time (i.e. prior to a predetermined date and time-of-day) should be transcribed. In accordance with this condition, only those messages which satisfy this characteristic will be transcribed from the recorder to which the transcribe station is connected and then, after such messages have been transcribed, the transcribe station will be connected to the next recorder (in sequence or by virtue of backlog) for the transcription of similar messages. It is appreciated that those messages which await transcription but which do not satisfy the aforementioned characteristic (i.e. those messages which were dictated later than the predetermined time) will not be transcribed before the next recorder is connected to the transcribe station. Other similar conditions may be established, whereby only those messages which satisfy those conditions will be transcribed. For example, only those messages which have been dictated later than a predetermined time, or have been dictated by a predetermined dictator or from a predetermined department, or only those messages which are of a predetermined type, or only those messages which are of a predetermined length, and so on, may be transcribed from the preselected recorders. Other messages which await transcription but which do not satisfy the selected characteristics will not be transcribed.

In the absence of entering predetermined conditions for the transcription of messages, as aforesaid, a transcribe station will not be changed over from one recorder to the next until all of the messages awaiting transcription in the preceding recorder have been transcribed.

When a transcribe station is connected to an appropriate one of the preselected recorders, that is, when the transcribe station is connected to the next sequential recorder or to the recorder having the greatest backlog, it will be connected to the dictate port or to the transcribe port depending upon whether or not messages are to be transcribed from that recorder on a "priority" basis.

The manner in which recorders are preselected for successive connection to a particular transcribe station now will be briefly described. The supervisory operator actuates keyboard 50 to control processor 44 to select a desired transcribe station. For example, the identity of that transcribe station may be keyed into the processor. Then, for the selected transcribe station, those recorders to which the transcribe station is to be connected successively are keyed in. The sequence in which those recorders are entered defines the sequence in which the transcribe station will be connected thereto unless such connection is to be made on the basis of backlog. After the identities of the appropriate recorders have been entered into processor 44, the operator then operates keyboard 50 to establish the criteria upon which the transcribe station is connected to these recorders. For example, the criteria may be sequential or determined by backlog. As an example, in executing the recorder preassignment operation, suitable headings may be displayed on display screen 46 to assist the supervisory operator. One of these headings may be "assign by backlog?" If the supervisory operator enters under this heading the designation "No", or "N", the recorders which have been selected will be connected to the identified transcribe station in the same sequence in which they had been selected. However, if the operator enters the designation "Yes", or "Y", then the recorders which have been preselected for the identified transcribe station will be connected thereto as a function of the greatest backlog thereamong. That is, the identified transcribe station first will be connected to the recorder having the greatest backlog and then, after the messages have been transcribed from that recorder, the transcribe station will be connected to the recorder having the next-greatest backlog, and so on. When "backlog" is the criteria for successive connection, the order in which the preselected recorders are entered does not affect the order in which those recorders are connected to the transcribe station.

Next, the supervisory operator may enter the predetermined characteristic which determines those messages that will be transcribed from each recorder. For example, the characteristic may be whether the messages were dictated prior to a predetermined time. To assist the supervisory operator, display screen 46 may display the column heading "Assign Only Before Time In". If all messages in a preselected tank are to be recorded, the operator may enter the indication "No", or "N". However, if only those messages which have been dictated prior to a predetermined time should be transcribed, then the operator will enter the date and time-of-day before which messages should be transcribed. Alternatively, the predetermined characteristic may be later than a predetermined time, whereupon the display screen may display the heading: "Assign Only After Time In"; or the predetermined characteristic may be a particular department from which the messages were dictated, whereupon the display screen may display the heading: "Assign Only If From Dept."; and so on.

After the appropriate recorders, criteria for connection and predetermined characteristics have been entered by the supervisory operator, the foregoing is repeated for the next and successive transcribe stations.

An example of the display provided by display screen 46 for this recorder preassignment is illustrated in FIG. 2. This illustration shows that recorders have been preassigned for each of transcribe stations #1–4, and some of these transcribe stations will be changed over from one recorder to the next in sequence and others will be changed over from one recorder to the next as a function of backlog. Also, some transcribe stations will transcribe all of the messages awaiting transcription in a recorder before being changed over to the next recorder, and other transcribe stations will transcribe only those messages which were dictated prior to predetermined times before being changed over to the next recorders.

The recorder preassignment operation may be initiated by operating, for example, a suitable keyboard switch, such as a "Recorder Assign" switch on keyboard 50. The operation of this switch results in the display of those column headings illustrated in FIG. 2. Thereafter, keyboard 50 is operated to preassign desired recorders to a respective transcribe station and to establish the criteria for selecting the next recorder to be connected to the transcribe station and also to select the message characteristics which determine those messages that will be transcribed. It is seen, from FIG. 2, that the endless-loop recorder designated R1 is to be connected to transcribe station #2 for the priority transcription of messages therefrom. This is indicated by the suffix "P" appended to this recorder identification, thus signifying that transcribe station #2 will be connected to the dictate port of recorder R1.

It will be appreciated that a suitable storage device, such as a random access memory (RAM), storage disk, or the like, may be provided to store the aforementioned preassignment data. Such a storage device may include sections associated with respective transcribe stations, and each section may have individual locations for storing the identities of those recorders to which the transcribe station is to be connected, and locations for storing the backlog data associated with such recorders, and the criteria and predetermined characteristics which are used to control the change over of the transcribe station from one recorder to the next.

For purposes of simplification, the storage device, or memory, in which the preassignment data is stored may be thought of as an addressable memory. Furthermore, each section of the memory that is associated with a transcribe station may include, for example, an "Assignment by Backlog" flag which, when reset, means that this transcribe station is to be connected in sequence to the preselected recorders and, when set, means that this transcribe station is to be connected to that recorder having the greatest backlog. Each such section also may include a portion for storing a "Before Time In" flag which, when reset, means that all of the messages are to be transcribed from a recorder before the transcribe station is connected to the next recorder and, when set, means that only those messages which were dictated prior to a designated predetermined time are to be transcribed before the transcribe station is connected to the next recorder.

The locations in each section of the memory in which the recorder identities are stored preferably are addressable locations. Table I below, represents a "memory map" that illustrates the foregoing, wherein each section associated with a respective transcribe station includes, for example, eight addressable locations, designated as indices 0-7. Each address index stores data identifying a particular recorder. Backlog data of each recorder may, if desired, also be stored at these addresses. As shown in Table I, data identifying recorders R3 and R4 are stored at address locations 0 and 1 for transcribe station #1. Data identifying recorders R1 and R2 are stored at address locations 0 and 1 for transcribe station #2, and recorder R1 is designated as being adapted for "priority" transcription. Table I also indicates the recorder identifying data that is stored at respective memory address locations for transcribe stations #3 and #4. It is seen that if the data represented in Table I is displayed, the resultant display will appear as shown in FIG. 2.

TABLE I
PREASSIGNMENT TABLE

| TR | INDEX | | | | | | | | Assignment by Backlog Flag | Before Time In |
|---|---|---|---|---|---|---|---|---|---|---|
|  | 0 | 1 | 2 | 3 | 4 | 5 | 6 | 7 | | |
| 1 | R3 | R4 | | | | | | | 0 | NO |
| 2 | R1P | R2 | | | | | | | 0 | Oct. 12/11:15 |
| 3 | R1 | R2 | R3 | R4 | | | | | 1 | NO |
| 4 | R2 | R1 | | | | | | | 1 | Sept. 30/15:00 |
| 5 | | | | | | | | | 0 | NO |

FIG. 2 also provides additional information pertaining to the overall operation and efficiency of the central dictation system with which the present invention is used. For example, the uppermost line of this display represents that portion of the capacity of the magnetic disc, known as the "jobs record" disc used in disc-drive mechanism 52, which is consumed with messages awaiting transcription. In the illustrated embodiment, "S-9%" means that 9% of the disc has been filled with job records associated with messages that have not yet been transcribed.

The top line also indicates that portion of the capacity of an archive disc that has been filled with job records. From aforementioned U.S. Pat. No. 4,319,337, it is recognized that an "archive disc" is one that merely stores information relating to job records associated with messages that have been fully transcribed. In the illustrated example, "A-5%" means that 5% of the capacity of the archive disc is filled with job records.

The top line of FIG. 2 also represents the system backlog in terms of tenths of minutes. That is, the representation "BACKLOG=205" means that a total length of messages equal to approximately 20.5 minutes has been recorded in the various recorders included in the central dictation system.

The top line of the illustrated display also indicates the average delay time of the overall central dictation system for transcribing a newly-recorded message. The example of "TURNAROUND=0.2" means that the total delay, from the time that a message is dictated until that message has been transcribed, is equal to 0.2 hours.

The top line of the display illustrated in FIG. 2 also represents the transcription rate of the entire central dictation system. In this example, "RATE=800" is the total transcription rate on the order of about 800 lines per hour. That is, with all transcriptionists operating at their respective rates, the overall central dictation system operates to transcribe, or type, 800 lines of messages each hour.

The top line of the illustrated display also indicates the date and actual time of day.

The next-following line illustrated in FIG. 2 is a display of the particular type of operation which the supervisory operator has selected. In FIG. 2, this display identifies the "recorder assign" operation, by which the preselected recorders are assigned to be connected successively to the respective transcribe stations, as indicated.

As mentioned above, and as is described in U.S. Pat. No. 4,319,337, in a central dictation system of the type shown in FIG. 1 having monitoring and displaying apparatus, when a transcribe station is connected to a particular endless-loop recorder, all of the messages which await transcription from that recorder, including those that have just been dictated, normally are provided with the "assigned" status, thus indicating that all of such messages have been assigned for transcription by that transcribe station. Job record data relating to such messages are stored in the memory of processor 44 and also at appropriate locations on the "jobs record" disc, as described in the aforementioned patent. Such job record data includes the status of each message. Hence, all messages in, for example, endless-loop recorder 32a, which await transcription are designated as "assigned" to the transcribe station connected to that recorder. When the stored data related to these messages is recalled and displayed on display screen 46, the supervisory operator merely will be apprised of the fact that such messages had been assigned to a particular transcribe station. If there are a large number of such messages which have been so assigned, it is possible that the transcriptionist who operates this transcribe station, although skillful and highly qualified, may not be able to transcribe all of these messages promptly. Furthermore, as additional messages are dictated onto tape T of this recorder, those messages also will be assigned to this transcriptionist. Data indicating that a large number of messages have been assigned to the transcriptionist but have not yet been completed may adversely affect the evaluation given to her performance. However, a poor evaluation would not be based upon inefficiency or lack of skill but, rather, would be due to the fact that new messages are "assigned" to that transcriptionist well before the time that such messages are positioned at, for example, transcribe port 76 for transcription.

This disadvantage is overcome by an aspect of the present invention wherein the data relating to the messages awaiting transcription from an endless-loop recorder are designated merely as "ready" to be assigned even though the recorder is connected to a particular transcribe station, and this status is not changed over to the "assigned" designation until the particular message actually arrives at the position for transcription. Of course, once that message is completely transcribed, its status designation is changed over to "complete", and the status of the next-following message now is changed over from "ready" to "assigned". In this manner, the quality and performance of the transcriptionist will not be unduly affected by the number of new messages which are being dictated while she transcribes older messages. Furthermore, data relating to the messages which await transcription in an endless-loop recorder now will more accurately reflect the true status of those messages; and the supervisory operator will be provided with a proper display of such status.

In a preferred embodiment of the present invention, both controller 42 and processor 44 include programmed devices by which each transcribe station is connected successively to the preselected endless-loop recorders, as described above. The programmed device included in processor 44 also is used to provide the appropriate status data for the respective messages which are dictated onto each recorder. Before describing the relevant routines of these programmed devices, reference is made to the partial block, partial schematic diagram illustrated in FIG. 3 which represents examples of the manner in which each of, for example, four transcribe stations may be connected to any one of, for example, six endless-loop recorders.

Figure 3:
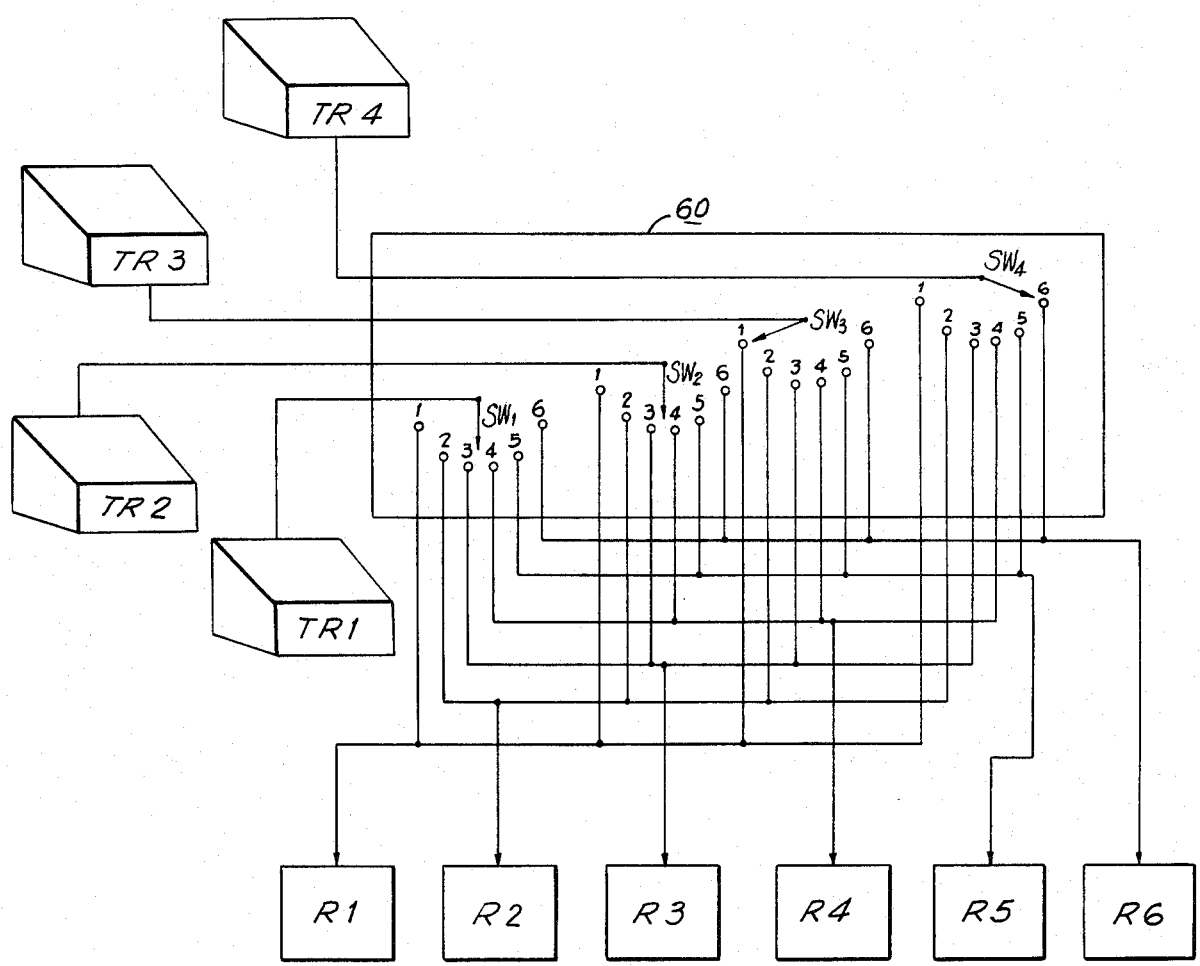
FIG. 3 is a partial block, partial schematic diagram representing the manner in which any one of several recovery stations may be connected to any one of a plurality of recorders.

For simplification, FIG. 3 illustrates an electromechanical switching arrangement for switching matrix 60. It will be appreciated that, in implementation, the switching matrix may be comprised of solid-state switching devices under the control of controller 42. It will be appreciated that any one of transcribe stations TR1, TR2, TR3 and TR4 may be connected, individually, to any one of endless-loop recorders R1, R2, R3, R4, R5 and R6. Furthermore, each transcribe station may be connected either to the dictate port or to the transcribe port of a respective recorder.

As schematically illustrated, a switching device SW1 is connected to transcribe station TR1, a similar switching device SW2 is connected to transcribe station TR2, switching device SW3 is connected to transcribe station TR3 and switching device SW4 is connected to transcribe station TR4. Each switching device is connected to each of recorders R1-R6. Depending upon the selected operation of the switching device, the transcribe station connected thereto is coupled to a corresponding one of the recorders.

The manner in which switching matrix 60 operates to carry out the recorder preassignments illustrated in FIG. 2 now will be described. Initially, switching device SW1 connects transcribe station TR1 to recorder R3. Switching device SW2 connects transcribe station TR2 to the dictate port of recorder R1. Switching device SW3 connects transcribe station TR3 to the one of recorders R1, R2, R3 and R4 which exhibits the greatest backlog. Let it be assumed, for purposes of the present discussion, that recorder R4 exhibits the greatest backlog. Hence, switching device SW3 connects transcribe station TR3 to recorder R4. Likewise, switching device SW4 connects transcribe station TR4 to the one of recorders R1 and R2 which exhibits the greatest backlog. Of these, let it be assumed that recorder R1 exhibits a greater backlog than recorder R2.

Transcribe station TR1 operates to transcribe all of the messages awaiting transcription from recorder R3. When the last message therein is completely transcribed, switching device SW1 next connects transcribe station TR1 to recorder R4.

Transcribe station TR2 transcribes only those messages from the dictate port of recorder R1 which were dictated prior to 11:15 A.M. on October 12. Once all of these messages have been transcribed, and even if additional messages await transcription, switching device SW2 changes over to connect transcribe station TR2 to recorder R2. In this connection, the transcribe station operates to transcribe only those messages awaiting transcription in recorder R2 which were dictated prior to 11:15 A.M. on October 12. Reference is made to U.S. Pat. No. 4,319,337 for a description of the manner in which those messages which were dictated prior to the designated time are located.

Transcribe station TR3 transcribes all of the messages awaiting transcription in recorder R4. Once all of these messages have been completely transcribed, switching device SW3 changes over to connect transcribe station TR3 to the next recorder having the greatest backlog. If this next recorder is recorder R1, it should be recognized that switching device SW4 will first disconnect transcribe station TR4 from recorder R3, then switching device SW3 will connect transcribe station TR3 to recorder R3, thus pre-empting transcription from transcribe station TR4.

Transcribe station TR4 is connected by switching device SW4 to recorder R1. As represented by the display shown in FIG. 2, transcribe station TR4 will transcribe from recorder R1 only those messages which had been recorded prior to 3:00 P.M. on September 30. When all of these messages have been transcribed, switching device SW4 changes over to connect transcribe station TR4 to recorder R2.

The manner in which switching devices SW1-SW4 are controlled to connect transcribe stations TR1-TR4 to recorders R1-R6 in accordance with the present invention, and in order to carry out the preassigned connections represented by FIG. 2, now will be described with reference to the flow charts shown in FIGS. 4A-4C. It will be appreciated that switching matrix 60 is controlled by controller 42 and/or processor 44 in accordance with the routine represented by these flow charts in order to connect a respective transcribe station to the appropriate recorder. For the purpose of the present discussion, it is assumed that processor 44 controls the switching matrix.

It is appreciated that processor 44 is programmed to carry out various routines and subroutines for monitoring and displaying information relating to the activity of the central dictation system with which it is used. During the course of carrying out its programmed instructions, the processor will execute the routine represented by the flow charts of FIGS. 4A-4C if one or more transcribe stations has been "preassigned" to be connected successively to preselected endless-loop recorders. For example, if the supervisory operator has effected such preassignment, as in the manner discussed in detail hereinabove, and as represented by Table I and FIG. 2, a suitable flag signal may be set which, when detected while the processor cycles through its programmed set of instructions, causes the processor to carry out this preassignment routine.

Referring now more particularly to the flow charts, when the processor executes the preassignment routine it carries out the illustrated operation in succession for each transcribe station that is operatively connected to an endless-loop recorder. Let it be assumed that this routine now is being carried out for transcribe station #1. Initially, inquiry is made as to whether the number of the last message which this transcriptionist has completely recovered has changed. This inquiry is intended to sense when the transcriptionist has completed transcribing the message. If the answer to this inquiry is in the negative, it is assumed that the transcriptionist has not yet completed the message which she is transcribing and, thus, the processor exits from the preassignment routine to continue with its programmed set of instructions. It will be understood that this preassignment routine is entered once again for the next transcribe station, such as transcribe station #2 and then #3 and so on, and ultimately the processor recycles to this routine to inquire of transcribe station #1 once again.

When the transcriptionist completes the transcription of a message, the inquiry of whether the number of the "last-completed" message has changed will be answered in the affirmative. Inquiry next is made of whether the number of pending preassignments remaining for this transcribe station is greater than 0. It is recognized that the information represented in Table I preferably is stored in a suitable portion of the processor memory or, alternatively, in any other appropriate storage device. This stored data is searched to uncover any remaining recorders to which this transcriptionist is to be connected. If this transcriptionist has completed the last message awaiting transcription in the last recorder to which the transcribe station is to be connected, this inquiry is answered in the negative and the processor exits from the illustrated preassignment routine. However, if this inquiry is answered in the affirmative, for example, if there still are additional recorders to which this transcribe station is to be connected, or if there still are messages awaiting transcription in the last of the preselected recorders to which this transcribe station is connected, the preassignment routine advances to the next inquiry.

The next inquiry in the preassignment routine is whether it has been established that the transcriptionist is to transcribe only those messages having a predetermined characteristic. In the present example, this characteristic is the time at which such messages have been dictated. That is, inquiry is made of whether the "before time in" switching criterion has been selected, i. e. whether the transcriptionist is to transcribe only those messages which have been dictated before a predetermined time. If so, the data base of the monitoring and displaying system, that is, the processor memory as well as the "jobs record" disc, are searched for job record data identifying a message which exhibits the "ready" status (i. e. it is "ready" to be transcribed) on the particular recorder (e. g. recorder 3) to which the transcribe station (e. g. transcribe station #1) is connected that was dictated before the specified "time in". After this search is made, inquiry is made of whether a job record of such a message having this predetermined characteristic was found. If such a message was uncovered, the result of the search is that a message awaiting transcription remains on this recorder, for example, a "message remaining" flag may be set. However, if no messages having this predetermined characteristic were found, an indication is provided that no messages remain on this recorder for transcription, and the "message remaining" flag is reset.

If message selection is not made on the basis of whether messages exhibit a predetermined characteristic, that is, if the inquiry of whether the "before time in" switching criterion has been selected is answered in the negative, inquiry is made of whether the total number of messages remaining on the recorder to which the transcribe station is connected is greater than 0. If so, an indication is provided that messages awaiting transcription remain on this recorder. However, if the total number of messages awaiting transcription from this recorder is not greater than 0, an indication is provided that no messages awaiting transcription remain.

After one or the other of the aforementioned indications is provided, inquiry is made of whether any messages awaiting transcription remain on the recorder to which this transcribe station is connected. If so, the processor exits from this preassignment routine because, as is appreciated, the conditions for connecting the transcribe station to the next recorder have not yet been satisfied. This is because the transcribe station will be changed over to the next recorder only after all of the appropriate messages have been transcribed from the preceding recorder. Hence, the processor returns to its main programmed set of instructions, during which the preassignment routine will be executed for succeeding transcribe stations. Eventually, this preassignment routine will be carried out once again for the transcribe station in question (e. g. transcribe station #1); and ultimately, as messages are transcribed, the inquiry of whether any messages awaiting transcription remain on the recorder to which this transcribe station is connected will be answered in the negative. At that time, that is, after the last message on this recorder has been transcribed, or more particularly, after the last message satisfying the predetermined characteristic (e. g. dictated before the designated "time in") has been transcribed, the preassignment routine advances to reset a "found recorder" flag, to set a "maximum backlog level" equal to 0, and to set an indexed address equal to 0. From Table I, it will be appreciated that the index address is used to preliminarily select the recorder whose identification is stored in memory at the indexed address. Job record information relating to the messages that have been recorded on this recorder are used to make the final determination of whether the transcribe station should be connected thereto.

Figure 4A:
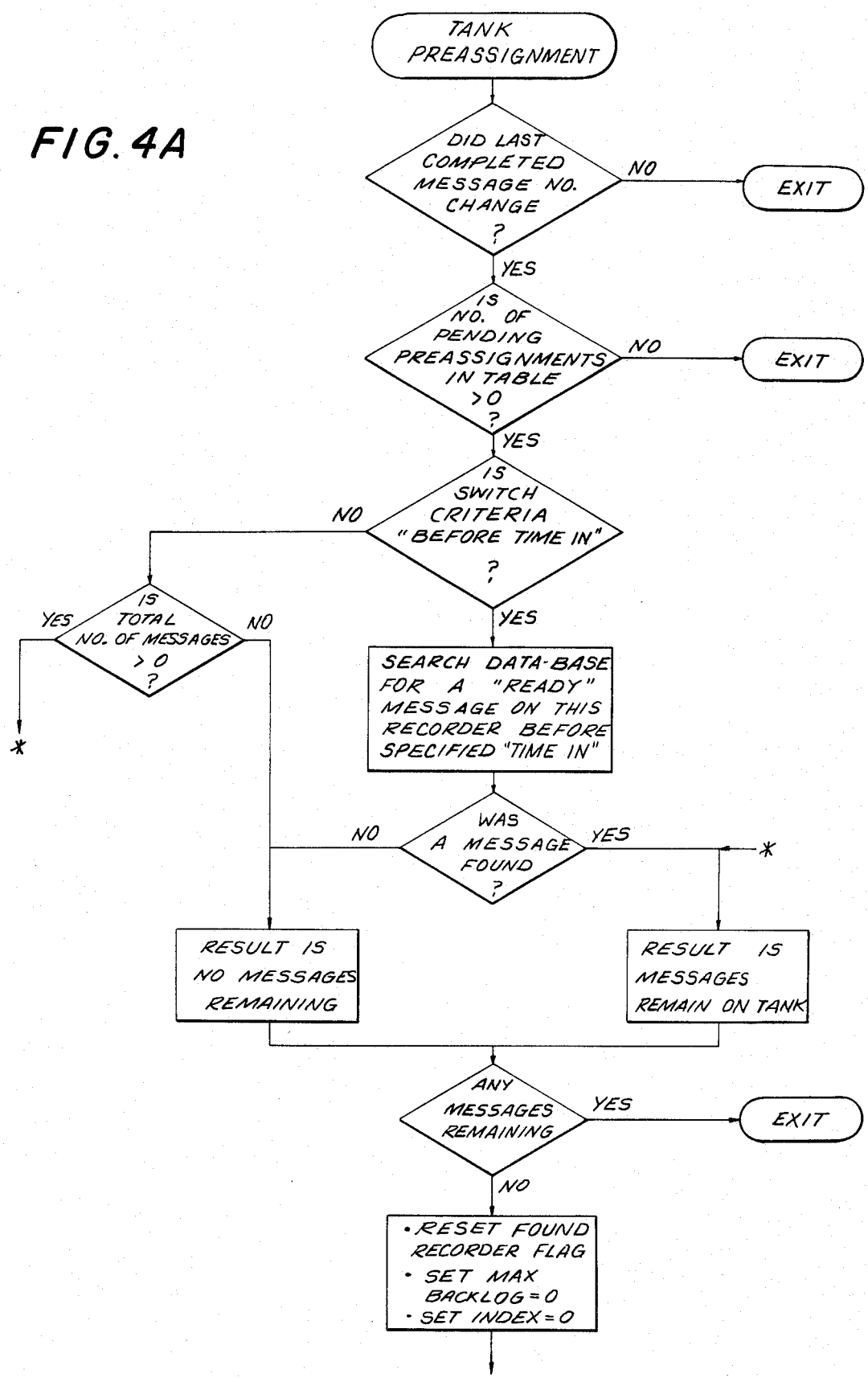
FIGS. 4A–4C, in combination, illustrate a flow chart broadly representing the manner in which one aspect of the present invention operates.
Figure 4B:
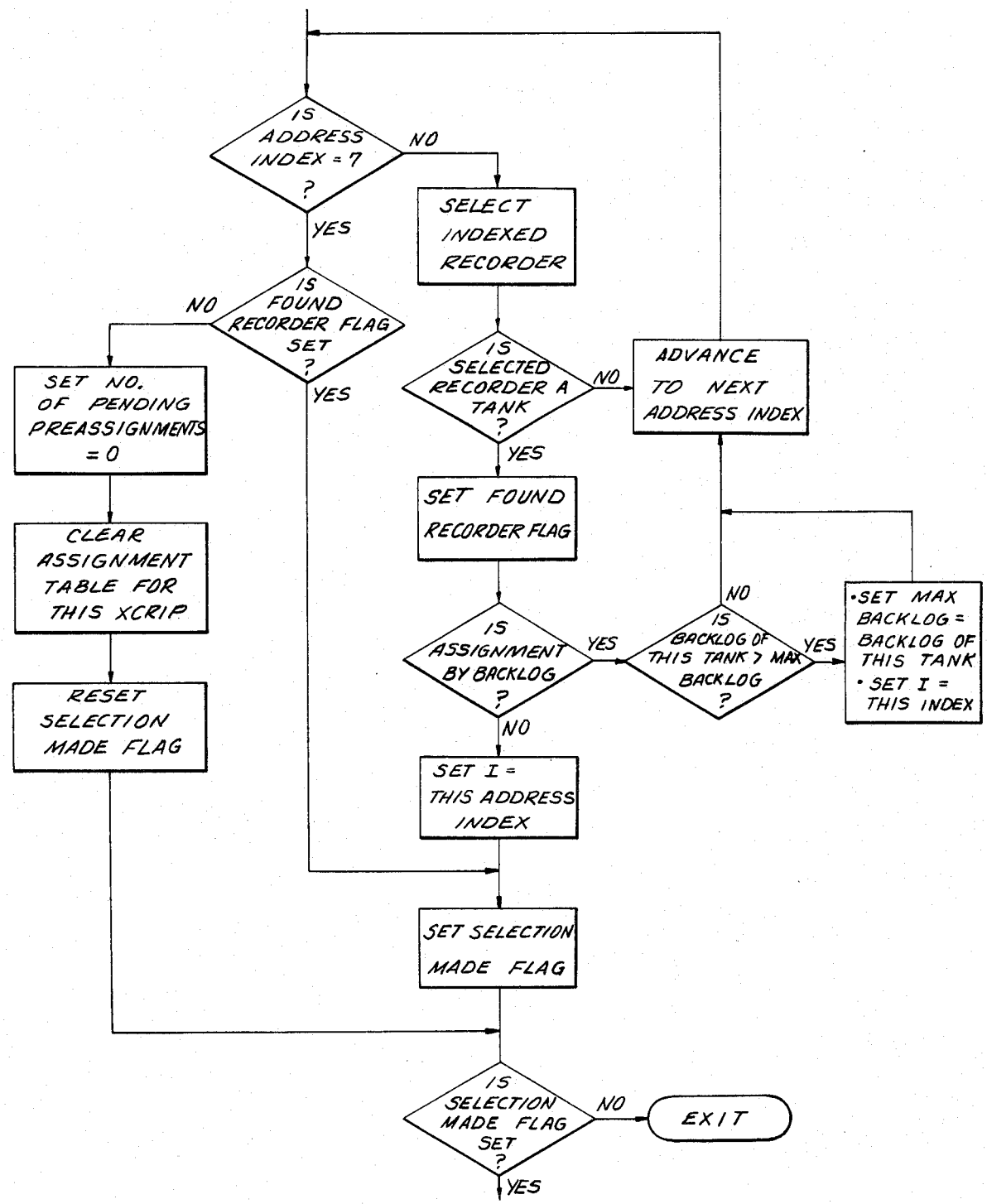

Advancing to FIG. 4B, inquiry is made as to whether the memory address now being indexed is equal to 7. As will be described, the indexed address is advanced successively from address 0 to address 7, and information relating to the messages recorded on the recorders whose identifications are stored in memory at such addressed locations is examined to determine whether that recorder should be connected to the transcribe station. Since the address index has just been set equal to 0, this inquiry now is answered in the negative.

Accordingly, the preassignment routine advances to preliminarily select the recorder whose identification is stored at this address index (e. g. the recorder whose identification is stored at address 0). Inquiry next is made as to whether this preliminarily selected recorder is an endless-loop recorder. (In the illustrated flow chart, a "tank" is intended to refer to an endless-loop recorder.) It is possible that, because of an error in preselecting those recorders to which the transcribe stations are to be connected, or because of a change in equipment that was not accompanied by a change in recorder preselection, the recorder whose identification is stored at the indexed address may not be an endless-loop recorder. If it is not, the address index is advanced to the next address, such as address 1, and the foregoing inquiry is made once again. This cycling continues until the recorder whose identification is stored at the address then being indexed is determined to be an endless-loop recorder. At that time, the "found recorder" flag is set.

After the "found recorder" flag is set, inquiry is made of whether the preassignments of recorders to this transcribe station (e. g. transcribe station #1) had been made on the basis of backlog. If not, that is, if the recorders are to be connected in the preassigned sequence to the transcribe station, a final selection address I is set equal to the address presently being indexed. Thereafter, a "selection made" flag is set.

However, if the recorders have been preassigned for connection on the basis of backlog, inquiry is made of whether the backlog of this recorder, that is, the recorder whose identification is stored at the address now being indexed, is greater than the maximum backlog level. In one embodiment, backlog information of the respective recorders may be stored in memory and may be sensed, or read out, by the address index. If the backlog of this recorder is not greater than the maximum backlog level, the address index is advanced to the next address, and the foregoing inquiries are repeated. This cycle continues until the backlog of the recorder whose identification is stored at the address then being indexed is greater than the maximum backlog level. Since the maximum backlog level initially had been set equal to 0, it is expected that the backlog of the first recorder whose identification is stored at the address then being indexed will be greater than this 0 backlog level. Then, the maximum backlog level is set equal to the backlog of this recorder, and the final selection address I is set equal to the address then being indexed. Thereafter, the address index is advanced to the next address; and the foregoing cycle is repeated.

It will be appreciated that the final selection address I is updated to identify the address at which is stored the identification of the recorder whose backlog is the maximum of those recorders to which this transcribe station has been preassigned. That is, the maximum backlog level is updated to indicate the greatest backlog exhibited by the group of recorders to which this transcribe station has been assigned, and the final selection address I indicates the address index at which is stored the identification of the particular recorder having this greatest backlog.

Eventually, the address index will be advanced to address 7. At that time, the address (I) at which is stored the identification of the recorder having the greatest backlog in the gr up of recorders to which this transcribe station has been assigned will have been indicated. When the address index is equal to 7, the preassignment routine advances to inquire whether the "found recorder" flag has been set. Normally, this flag will be set because it is expected that at least one of the recorders whose identifications are stored in the addressable memory will be an endless-loop recorder. Thereafter, the "selection made" flag is set; and inquiry next is made of whether this "selection made" flag has been set. If this flag has not been set, for example, if none of the recorders to which this transcribe station is preassigned is an endless-loop recorder, the processor exits from the preassignment routine. However, if the "selection made" flag is set, the endless-loop recorder whose identification is stored at the final selection address I is selected.

Returning to the inquiry of whether the "found recorder" flag has been set, if this inquiry is answered in the negative, the number of pending preassignments to this transcribe station is set equal to 0. Also, the contents of the preassignment table (Table I) for this transcribe station is cleared. With respect to Table I, this means that the recorder identifications stored at the respective address indices for this transcribe station are cleared. This effectively cancels the preassignment of this transcribe station. Thereafter, the "selection made" flag is reset.

From the foregoing description, it is seen that if a transcribe station is assigned to one or more recorders for successive connection thereto, but none of these recorders is an endless-loop recorder, the pending preassignments of recorders to this transcribe station are cleared and the "selection made" flag is not set. This instructs the processor to exit the preassignment routine upon answering the inquiry of whether the "selection made" flag is set in the negative.

Figure 4C:
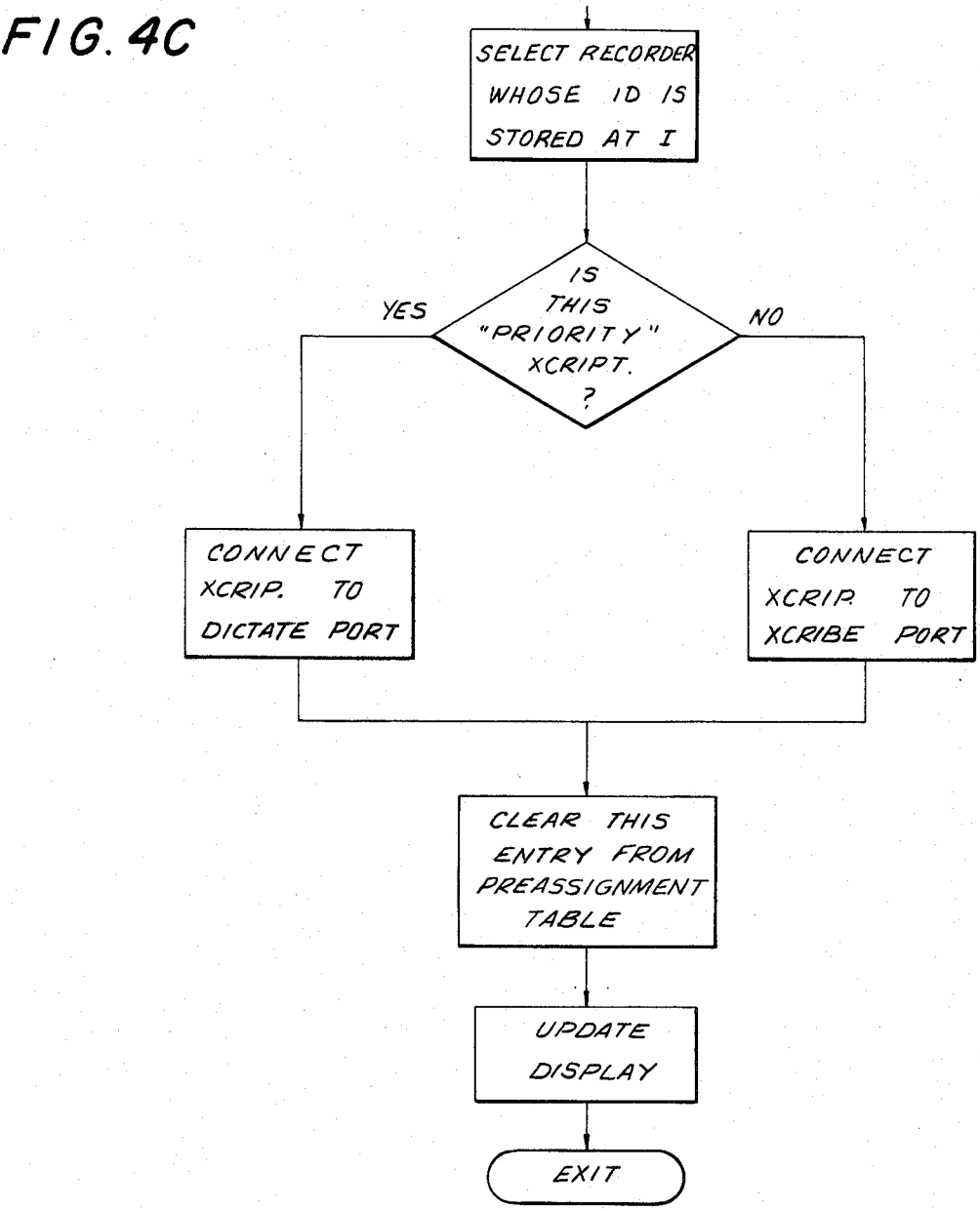

Advancing to the flow chart of FIG. 4C, if the "selection made" flag is set, that is, if at least one recorder in the group to which this transcribe station is assigned is an endless-loop recorder, and if the appropriate endless-loop recorder has been preliminarily selected, that is, the next-sequential recorder in the preassigned group has been preliminarily selected or, alternatively, if selection is made on the basis of backlog, the one recorder in this group having the greatest backlog has been identified, the recorder whose identification is stored at the final selection address I is selected. Next, inquiry is made of whether the messages stored on this recorder are to be transcribed from the dictate port. That is, inquiry is made of whether the transcription is to proceed as a "priority" transcription. From Table I, it is seen that a "priority transcribe" flag associated with each recorder identification stored at the respective address indices may be set or reset to indicate whether transcription should proceed as a "priority" transcription. If this flag is set, the suffix "P" is appended to the recorder identification. If transcription should proceed on a "priority" basis, the transcribe station in question (assumed herein to be transcribe station #1) is connected to the dictate port of the selected recorder. However, if transcription is to proceed as a "normal" transcription, this transcribe station is connected to the transcribe port of the selected recorder.

Then, after connecting the transcribe station to the appropriate port of the selected recorder, as by the operation of switching matrix 60 (FIG. 3), the identification of this recorder is cleared from the preassignment table. Also, if display 46 is operated to provide a display of those recorders which have been assigned to respective transcribe stations, this display is updated to reflect that this recorder no longer is preassigned to this transcribe station. The processor then exits from the preassignment routine.

The foregoing description of the preassignment routine illustrated in FIGS. 4A-4C will best be understood by a further description thereof in conjunction with specific examples. In particular, let it be assumed that the preassignment routine is carried out with respect to transcribe station #2 which, as indicated in Table I and as illustrated in FIG. 2, is assigned to be connected to the dictate port of recorder R1 for transcribing all messages which have been dictated prior to 11:15 A.M. on October 12; and once all of such messages have been completely transcribed, transcribe station #2 is to be connected to recorder R2 for transcribing such messages.

For the purpose of the present description, it is assumed that, prior to being changed over to recorder R1, transcribe station #2 is connected to a previous recorder (not shown in FIG. 2 or in Table I). It is further assumed that transcribe station #2 has transcribed all messages from this previous recorder that were dictated thereon prior to 11:15 A.M. on October 12. Hence, with respect to the flow chart shown in FIGS. 4A–4C, the inquiry of whether the message number of the "last-completed" message has changed is answered in the affirmative, and the inquiry of whether the number of pending preassignments for transcribe station #2 is greater than 0 also is answered in the affirmative.

Since only those messages which satisfy the predetermined characteristic (i. e. were dictated prior to 11:15 A.M. on October 12) are to be transcribed, the data base in which job records relating to dictated messages is searched for a message that had been recorded on the previous recorder prior to the specified "time in" having "ready" status. Since it is assumed herein that all such messages have been transcribed by transcribe station #2, it is expected that no such messages will be found by this search. Accordingly, an indication of "no messages remaining" is provided.

The next inquiry of whether any messages remain for transcription will be answered in the negative; and the preassignment routine advances to reset the "found recorder" flag, to set the maximum backlog level to 0, and to set the address index equal to 0. Then, as shown in FIG. 4B, the inquiry of whether the address index is equal to 7 is answered in the negative, and the recorder whose identification is stored at the memory address then being indexed is preliminarily selected. As shown in Table I, in the memory section associated with transcribe station #2, the identification of recorder R1 is stored at address 0, the address now being indexed. Assuming that recorder R1 is an endless-loop recorder, the "found recorder" flag is set. Then, the inquiry of whether recorders are selected on the basis of backlog is answered in the negative (as represented in Table I); and the final selection address I now is set equal to address 0, the address now being indexed. Thereafter, the "selection made" flag is set; and the inquiry of whether this "selection made" flag is set is answered in the affirmative.

Continuing with the flow chart shown in FIG. 4C, recorder R1, the recorder whose identification is stored at the final selection address I (where I=0) is selected. Inquiry of whether transcription should proceed from this recorder in the "priority" mode is answered in the affirmative. For example, it is assumed that the priority flag associated with the identification of this recorder is set for "priority" transcription, as shown in Table I. Consequently, transcribe station #2 is connected to the dictate port of recorder R1 to transcribe the dictated messages from this port. Then, the identification of recorder R1 is cleared from the preassignment table; and any display of the recorder preassignments is updated. Preferably, but not necessarily, the address indices of the recorder identifications which are stored for transcribe station #2 are shifted to account for the cleared entry from address index 0. That is, the identification of recorder R2 is shifted from address index 1 to address index 0.

The processor then exits from the preassignment routine; and eventually this routine will be executed once again for transcribe station #2.

The next time the preassignment routine is carried out for transcribe station #2, inquiry is made as to whether the number of the "last-completed" message has changed. If not, that is, if the transcriptionist still is transcribing the same message, the processor exits from this routine. However, once the transcriptionist has completed her transcription of this message, the aforementioned inquiry is answered in the affirmative and inquiry next is made as to whether the number of pending preassignments for transcribe station #2 is greater than 0. In the present example, this inquiry is answered in the affirmative; and the next-following inquiry of whether only messages having the predetermined "before time in" characteristic are to be transcribed also is answered in the affirmative. The data base then is searched for "ready" messages which had been transcribed from recorder R1, the recorder to which transcribe station #2 presently is connected, prior to the specified "time in". If a message satisfying this predetermined characteristic is found, an indication thereof is provided and the inquiry of whether any messages remain for transcription on recorder R1 is answered in the affirmative. The processor then exits from the preassignment routine; and the found message is transcribed.

The foregoing cycle is repeated whenever the processor carries out the preassignment routine for transcribe station #2. Ultimately, the transcriptionist will transcribe the last message from recorder R1 that had been dictated prior to the specified "time in". After this message has been transcribed, the search through the system data base for another "ready" message on this recorder that satisfies the predetermined characteristic will not be successful. Hence, the inquiry of whether a message has been found will be answered in the negative, and an indication that no messages remaining for transcription will be provided. Thereafter, the inquiry of whether there are any messages remaining for transcription will be answered in the negative; and the "found recorder" flag then is reset, the maximum backlog level is set equal to 0 and the address index is set equal to 0.

Continuing with the flow chart shown in FIG. 4B, the inquiry of whether the address index is equal to 7 is answered in the negative. Accordingly, the recorder whose identification is stored at the address then being indexed (i.e. address index=0) is preliminarily selected. From Table I, it is seen that recorder R2 is preliminarily selected. The inquiry of whether the selected recorder is an endless-loop recorder is answered in the affirmative, and the "found recorder" flag now is set. Since the assignments of recorders to transcribe station #2 are not based upon backlog, the next following inquiry is answered in the negative and the final selection address I is set equal to the address then being indexed. In the present example, the final selection address I now is set equal to 0. Thereafter, the "selection made" flag is set and, since the inquiry of whether this flag has been set is answered in the affirmative, recorder R2 whose identification is stored at the final selection address I is selected. Since the "priority" flag associated with recorder R2 is reset, transcribe station #2 is connected to the transcribe port of this recorder. Then, the entry of recorder R2 is cleared from the preassignment table, and the recorder assignment display data is updated. The processor then exits from the preassignment routine.

Eventually, when the preassignment routine is repeated for transcribe station #2, the processor will exit therefrom until the transcriptionist completes the transcription of the last message that was dictated before the predetermined "time in". At that time, the inquiry of whether the number of the "last-completed" message has changed will be answered in the affirmative; and the next inquiry of whether the number of pending preassignments for transcribe station #2 is greater than 0 will be answered in the negative. Thus, the processor will exit from the preassignment routine because transcribe station #2 will have been connected to all of the recorders to which it had been preassigned.

The preassignment routine that is carried out for transcribe station #3 now will be described. Let it be assumed that the transcriptionist at transcribe station #3 has just completed the transcription of the last message that had been recorded on a previous recorder. The first two inquiries shown in the flow chart of FIG. 4A both will be answered in the affirmative; and the next inquiry of whether only messages which had been dictated before a predetermined "time in" should be transcribed is answered in the negative. As shown in Table I, the messages which are transcribed by transcribe station #3 are not based upon this predetermined characteristic. Thus, all of the messages that are recorded on the recorder to which transcribe station #3 is connected will be transcribed.

As mentioned above, it is assumed that the last message on the preceding recorder has been fully transcribed by the transcriptionist. Accordingly, inquiry of whether the total number of messages remaining on this recorder is greater than 0 is answered in the negative. An indication thus is provided that no messages remain for transcription, and the inquiry of whether there are any messages remaining is answered in the negative. Hence, the "found recorder" flag is reset, the maximum backlog level is set equal to 0 and the address index is set equal to 0.

Continuing with the flow chart shown in FIG. 4B, the inquiry of whether the address index is equal to 7 is answered in the negative. Hence, the recorder whose identification is stored at the address then being indexed, that is, the identification stored at address index 0, is preliminarily selected. From Table I, it is seen that recorder R1 is preliminarily selected. Assuming that this recorder is an endless-loop recorder, the next following inquiry is answered in the affirmative, and the "found recorder" flag is set.

The next inquiry of whether transcribe station #3 is to be assigned to the recorder having the greatest backlog is answered in the affirmative. From Table I, it is seen that the "assignment by backlog" flag had been set. Next, inquiry is made as to whether the backlog of the preliminarily selected recorder, that is, the backlog of recorder R1, is greater than the maximum backlog level. Since this level has been set to 0, it is assumed that this inquiry is answered in the affirmative. Consequently, the maximum backlog level now is updated to be equal to the backlog of recorder R1, and the final selection address I now is set equal to the address at which the identification of recorder R1 is stored. The final selection address I is, temporarily, set equal to 0. Then, the address index is advanced to the next address, that is, to address 1.

Repeating the foregoing loop, the inquiry of whether the present address index is equal to 7 is answered in the negative, and the recorder whose identification is stored at the address presently being indexed, that is, address 1, is preliminarily selected. This recorder is seen to be recorder R2, and it is further assumed that this recorder also is an endless-loop recorder. Hence, the "found recorder" flag is set and, since the "assignment by backlog" flag had been set, inquiry is made as to whether the backlog of the preliminarily selected recorder, that is, the backlog of recorder R2 is greater than the maximum backlog level, that is, the backlog of recorder R1. If it is not, the final selection address I remains set at 0, and the maximum backlog level remains equal to the backlog of recorder R1. The address index then is advanced to the next address, that is, to address 2, and the foregoing loop is repeated.

Let it now be assumed that the backlog of recorder R3, that is, the backlog of the recorder whose identification is stored at address index 2, exhibits the greatest backlog of those recorders to which transcribe station #3 is preassigned. Thus, when the aforementioned loop is repeated, the inquiry of whether the backlog of the recorder which has been preliminarily selected, that is, the backlog of recorder R3, exceeds the maximum backlog level (i.e. the backlog of recorder R1) is answered in the affirmative. As a consequence thereof, the maximum backlog level now is updated to be equal to the backlog of recorder R3, and the final selection address I now is set equal to address 2. Then, the address index is advanced to the next address, that is, to address 3; and the foregoing loop is repeated once again.

Since the address being indexed is not yet equal to 7, recorder R4, the recorder whose identification is stored at address 3, the address now being indexed, is preliminarily selected. Assuming that recorder R4 is an endless-loop recorder, the inquiry of whether the backlog of recorder R4 is greater than the maximum backlog level (i. e. the backlog of recorder R3) is answered in the negative. Thus, the final selection address I remains at address 2, and the maximum backlog level remains equal to the backlog of recorder R3. The address index then is advanced to the next address, that is, address 4, and the foregoing loop is repeated.

It is seen from Table I that recorder identifications are not stored at address indices 4, 5, 6, or 7. Hence, although the aforementioned loop is repeated for each of these address indices, the inquiry of whether the preliminarily selected recorder is an endless-loop recorder is answered in the negative. This loop shown in FIG. 4B is repeated until address index 7 is reached. At that point, the inquiry of whether the address index is equal to 7 is answered in the affirmative. The next inquiry of whether the "found recorder" flag is set also is answered in the affirmative. It is recalled that this flag had been set when recorder R1 had been preliminarily selected.

Since the "found recorder" flag had been set, the "selection made" flag now is set. The next inquiry of whether the "selection made" flag has been set is answered in the affirmative and, proceeding with the flow chart shown in FIG. 4C, the recorder whose identification is stored at the final selection address I is selected. From the foregoing description, it is recalled that the final selection address I was set equal to address 2, the address at which the identification of recorder R3, the recorder having the greatest backlog, was stored. From Table I, it is seen that transcription is to proceed from recorder R3 in the "normal" mode. Hence, the inquiry of whether a "priority" transcription is to be carried out is answered in the negative; and transcribe station #3 is connected to the transcribe port of recorder R3. Then, the entry of recorder R3 is cleared from the preassignment table and the recorder assignment display data is updated. The processor then exits from the preassignment routine.

It is appreciated that, when the processor next enters the preassignment routine for transcribe station #3, only the initial instructions of this routine will be carried out until the last message is transcribed from recorder R3. Once this occurs, the remainder of the preassignment routine is carried out in the manner described above. That is, the one recorder of remaining recorders R1, R2 and R4 to which transcribe station #3 may be connected, having the greatest backlog, is selected. The transcribe station then is connected to this selected recorder until all of the messages dictated thereon have been transcribed. Then, the preassignment routine is carried out once again to determine which of the remaining recorders has the greatest backlog. Transcribe station #3 is connected to that recorder until all messages therein have been transcribed; whereupon the transcribe station is connected to the recorder having the next-highest backlog. This procedure is repeated until transcribe station #3 has been connected to all of the recorders to which it has been preassigned.

It will be appreciated that, advantageously, after transcribe station #3 is connected to a particular recorder, the entry of that recorder in the preassignment table is cleared, and, if desired, all recorder identifications which are stored in locations shown to the right of this cleared entry may be shifted to the left such that successive memory address locations have recorder identifications stored therein.

The foregoing description of the manner in which transcribe stations #2 and #3 are connected successively to preassigned recorders is illustrative of the manner in which the preassignment operation is carried out. Thus, it is seen that a transcribe station is connected to recorders either in the same sequence in which those recorders had been preselected, or preassigned, or as a function of backlog. In the latter, the transcribe station is connected to the recorder having the greatest backlog among those recorders to which the transcribe station has been preassigned. Also, it is seen that, once the transcribe station is connected to a respective recorder, either all of the messages awaiting transcription in that recorder are transcribed or only those messages which satisfy the predetermined characteristic (e.g. have been dictated before a designated "time in") are transcribed. Once all of the appropriate messages have been transcribed from the recorder, the next recorder, either in the preselected sequence or the one having the greatest backlog, is connected to the transcribe station.

In accordance with another aspect of the present invention, the status information of the job records of messages which have been dictated onto an endless-loop recorder more accurately reflects the actual status of individual ones of those messages than had been provided in previous monitoring and displaying apparatus, such as the apparatus described in U.S. Pat. No. 4,319,337. More particularly, and as described above, in previous systems all of the messages which await transcription from an endless-loop recorder are accorded the "assigned" status when that recorder is connected to a transcribe station. That is, job records pertaining to such messages indicate that they are "assigned" to be transcribed by the transcribe station then connected to the recorder. However, it is possible, and even highly likely, that a particular message, although "assigned" to a specific transcribe station, may be transcribed by a different transcribe station at a subsequent time or date. For example, the transcriptionist who operates the first transcribe station may not complete all of the messages assigned thereto; and such messages may be transcribed subsequently by a different transcriptionist at a different transcribe station.

For proper record keeping it is necessary to update the job records of those messages which had not, in fact, been transcribed. Heretofore, such updating has been achieved only under keyboard control of the supervisory operator. It is appreciated that, in a relatively large central dictation system, this updating is time-consuming and complicated, and often may not be carried out. As a consequence, erroneous job records (i.e. those records containing improper "assigned" data) will not be corrected. Hence, incorrect information will be displayed when the supervisory operator inquires of the status of particular messages, or the status of particular endless-loop recorders, or the performance of particular transcriptionists.

As will now be described with reference to the flow chart shown in FIG. 5, it is a feature of the present invention to accord the "assigned" status to a message in an endless-loop recorder only when that message currently is being transcribed. In the event that this message is not completely transcribed, its status automatically reverts back to the "ready" status, thus indicating that it is "ready" to be transcribed but has not yet been assigned to a specific transcribe station. This proper control over the status of dictated messages is carried out by processor 44 in the automatic job assignment (also referred to herein as the auto job assignment) routine which is executed by the processor during the performance of its main, or overall routine. This auto job assignment routine is carried out for each endless-loop recorder. In order to simplify the description herein, this routine is described only for one such recorder; and it will be appreciated that the routine is repeated for each additional endless-loop recorder in the central dictation system.

As mentioned above, each endless-loop recorder is capable of being connected to a transcribe station at its dictate port and also at its transcribe port. Such connections are independent of each other; and messages may be transcribed simultaneously from both ports. The auto job assignment routine illustrated by the flow chart shown in FIG. 5 is representative of those steps which are carried out in connection with the transcription of a message from one of the two ports. It should be understood that, after the routine is executed for one port, it is repeated for the other.

The initial inquiry in the auto job assignment routine is whether a new transcribe station has been connected to the port in question (e.g. the dictate port) or whether the number of the message being transcribed from that port has changed. It will be appreciated that the number of the message will change when the transcriptionist advances to a new message. If this inquiry is answered in the negative, inquiry next is made of whether an "auto assign" flag is set. As will be explained below, the "auto assign" flag normally is reset except when the transcriptionist commences transcription of a new message. It should be understood that this flag is useful in differentiating between fast movement of the record medium and normal, or "slow" movement thereof. If the "auto assign" flag is not set, this portion of the auto job assignment routine (i.e. inquiring if the "auto assign" flag is set) is repeated for the other port of the endless-loop recorder (e.g. for the transcribe port).

If the "auto assign" flag is set, for example, when the transcriptionist commences transcription of a new message, the data base in which job records are stored is searched for a message having "ready" status that has been recorded on this recorder and having the number of the message now being transcribed by the transcriptionist. After the data base is searched, inquiry is made of whether the job record of such a "ready" status designated message was found. If not, the "auto assign" flag is reset, and then the auto job assignment routine is repeated for the other port of the recorder.

If a job record of this "ready" designated message was found, the message is "assigned" to be transcribed by the transcribe station (or transcriptionist) connected to the port in question. That is, the identity of this transcribe station is added to the job record. Then, the status data included in the job record relating to this message is changed over from the "ready" status to the "assigned" status; and the time at which the message was assigned (referred to as the "time out" data) is updated to reflect the present time-of-day. Next, a "hard copy" of this job record is printed by printer 56 to indicate this change in status. Then, the "auto assign" flag is reset; and the auto job assignment routine is repeated for the other port of this recorder.

Returning to the beginning of the auto job assignment routine, if the inquiry of whether a new transcribe station has been connected to the port in question of the recorder, or whether the number of the message being transcribed from this port has changed, is answered in the affirmative, inquiry next is made of whether the "auto assign" flag is reset. As mentioned above, the "auto assign" flag normally is reset; and it is assumed herein that this inquiry is answered in the affirmative. In response to this answer, the data base is searched for a job record of a message having the "assigned" status which was recorded on this recorder, and which had been assigned for transcription by this transcribe station and which exhibited the preceding message number. That is, the data base is searched to determine if the preceding message had been only partially transcribed by this transcribe station. It is assumed that the transcriptionist has advanced the endless tape to the next or succeeding messages, and this advancement of the tape is indicated when the number of the message being transcribed changes. If the preceding message had not been completely transcribed, its status will remain as "assigned". Of course, if that message had been fully transcribed, its status would have changed from "assigned" to "completed".

After the data base is searched, inquiry is made of whether a job record of the "assigned" designated message has been found. It will be appreciated that this job record will not be found if the previous message had been completely transcribed because its status will be "completed" and not "assigned". If a job record is not found, inquiry is made of whether the number of the message now in position for transcription is equal to 0. Generally, this inquiry will be answered in the affirmative only during the start-up procedure of the monitoring and displaying apparatus. From the flow chart of FIG. 5, it is seen that this inquiry also is made in the event that a new transcribe station is connected to the port in question or the number of the message at this port has changed, and the "auto assign" flag is not reset. In any event, if this inquiry is answered in the negative, the "auto assign" flag now is set. In the alternative, if this inquiry is answered in the affirmative, the "auto assign" flag is reset.

After setting (or resetting) the "auto assign" flag, the auto job assignment routine is repeated for the other port of this recorder.

Returning to the step of searching the data base for a job record of the previous message (e.g. the message whose identifying number preceded that of the message now present at the port for transcription) having the "assigned" status, if the inquiry of whether such a job record was found is answered in the affirmative, thus indicating that the previous message was not completely transcribed, that message is "unassigned" from the transcriptionist to which it had been assigned for transcription. That is, the identity of the "assigned" transcribe station is deleted from this job record. Then, the status of this message is changed over from the "assigned" status to the "ready" status, and the "time out" data, that is, the time at which that message had been assigned to the transcriptionist, is cleared from the job record. Printer 56 then is actuated to print a hard copy of this job record having the changed (or "ready") status. Then, inquiry is made of whether the number of the message whose status data has been changed is equal to 0. Generally, it is expected that this inquiry will be answered in the negative; and the "auto assign" flag then is set. Thereafter, this portion of the auto job assignment routine is repeated for the other port of the recorder.

The manner in which the auto job assignment routine is carried out will best be understood in conjunction with typical examples, now to be described. In order to simplify the following discussion, it is assumed that a transcribe station is connected to the transcribe port of the recorder in question, and that no transcribe station is connected to the dictate port. Initially, the "auto assign" flag is reset. As a numerical example, let it be assumed that the transcriptionist is in the process of transcribing message #15 from the recorder. The first inquiry in the auto job assignment routine of whether the transcribe station or message being transcribed has changed is answered in the negative. Since the "auto assign" flag has been assumed to be reset, and since it is further assumed that the dictate port of this recorder is not connected to a transcribe station, the processor then exits from this routine. Inquiry of whether the message being transcribed has changed is repeated successively until, ultimately, the previous message is completely transcribed. Then, when the next message (e.g. message #16) is positioned for transcription, the inquiry of whether the message has changed is answered in the affirmative.

When the next message (i.e. message #16) is detected, the auto job assignment routine advances to inquire if the "auto assign" flag is reset. It is recalled that this flag has been assumed to be in its reset condition. Accordingly, this inquiry is answered in the affirmative and the data base is searched for a job record relating to the previous message, that is, to message #15, having the "assigned" status and having been recorded on the recorder in question. Since it has been assumed that message #15 was completely transcribed, and since, upon the completion of transcription, the status associated with the transcribed message is changed from "assigned" to "completed", it is expected that the search through the data base will not find an "assigned" message #15 that had been recorded on this recorder. Accordingly, the inquiry of whether the job record was found will be answered in the negative.

Thereafter, the auto job assignment routine advances to inquire if the number of the message then positioned at the transcribe station is equal to 0. Since it has been assumed that the message now in position for transcription is message #16, this inquiry is answered in the negative and the "auto assign" flag is set. Then, because the dictate port of this recorder is not connected to a transcribe station, the processor exits from the auto job assignment routine.

In the next execution of the auto job assignment routine, inquiry is made of whether the message positioned at the transcribe station has changed. It is recalled that this inquiry previously was answered in the affirmative because message #16 was then positioned for transcription. Since message #16 remains in position for transcription, this inquiry now is answered in the negative.

The next inquiry of whether the "auto assign" flag is set now is answered in the affirmative. From the foregoing description, it is recalled that this flag was set upon detecting a change in the message positioned for transcription.

The auto job assignment routine then advances to search the data base for a job record of message #16 recorded on this recorder having the "ready" status. It is expected that the appropriate job record will be found. If so, the inquiry of whether a job record was found is answered in the affirmative, and message #16 now is assigned to be transcribed by the transcriptionist at the transcribe station which is connected to the transcribe port of this recorder. The identity of this transcribe station (or of the transcriptionist) is added to the job record of message #16.

After assigning message #16 to the transcriptionist, the status in the job record associated with this message is changed over from "ready" to "assigned"; and the "time out" data of this job record is updated to indicate the time at which message #16 was assigned to the transcriptionist. Then, a hard copy of this job record is printed by printer 56 and the "auto assign" flag now is reset. Since the dictate port of this recorder is not connected to a transcribe station, the processor then exits from the auto job assignment routine.

The processor successively cycles through the auto job assignment routine in the manner described hereinabove until the tape of this recorder is advanced to position a fresh message (e.g. message #17) at the transcribe port for transcription. Let it be assumed that, prior to completely transcribing message #16, the tape is advanced such that message #17 is positioned for transcription.

Upon the next cycle of the processor through the auto job assignment routine, the inquiry of whether the message positioned for transcription has changed now will be answered in the affirmative. Since the "auto assign" flag had been reset when previous message #16 had been accorded the "assigned" status, the data base now is searched for message #16 (i.e. the previous message) having the "assigned" status, recorded on this recorder and assigned to the transcribe station connected to the transcribe port of this recorder. It is expected that a job record having these characteristics will be found. Consequently, the inquiry of whether such a job record was found will be answered in the affirmative, and this message now will be unassigned from the transcriptionist. That is, the identification in the job record associated with message #16 of the transcribe terminal to which message #16 had been assigned for transcription will be deleted. Then, the status data of the job record associated with message #15 will be changed over from "assigned" status to "ready" status; and the "time out" data of this job record will be cleared. The job record associated with message #16 thus will revert back to the form it had prior to the assignment of this message to the transcribe station.

After the job record associated with message #16 is reverted back to its "ready" status form, a hard copy of the job record is printed by printer 56. Then, since the number of the message now positioned for transcription is message #17, the inquiry of whether the number of this message is equal to 0 is answered in the negative; and the "auto assign" flag is set. Since the dictate port of this recorder is not connected to a transcribe station, the processor exits from the auto job assignment routine.

Upon the next cycle of the processor through the auto job assignment routine, message #17 will be assigned to the transcribe station connected to the transcribe port of the recorder, that is, the identification of the transcribe station is added to the job record associated with message #17, and the status data of this job record will be changed over from "ready" status to "assigned" status. Thus, the auto job assignment routine represented by the flow chart shown in FIG. 5 serves to unassign a previous message if a fresh message is positioned for transcription prior to the complete transcription of that previous message, and also serves to accord "assign" status to the fresh message.

It is seen that, although a recorder may be connected to a transcribe station, those messages which await transcription are not assigned in bulk to that transcribe station. Rather, only the one message which is "ready" for transcription and which is actually in position to be transcribed is accorded "assigned" status. All other messages must await their proper positioning for transcription before the "assigned" status is accorded thereto. Also, if a message which exhibits the "assigned" status is not completely transcribed, this message will be unassigned from the transcribe station and its status will revert back to the "ready" status, in the event that a fresh message is positioned for transcription. Therefore, the present invention provides accurate record keeping of the various messages which are recorded, which are in the process of being transcribed and which are completely transcribed. This facilitates the supervision of the central dictation system and, more particularly, the whereabouts and status of the various messages that are recorded and transcribed in that system. Furthermore, the auto job assignment routine enables a more accurate evaluation of the performance and quality of a transcriptionist.

While the present invention has been particularly shown and described with reference to certain preferred embodiments, it is readily appreciated by those of ordinary skill in the art that various changes and modifications in form and details may be made without departing from the spirit d scope of the invention. For example, the auto job assignment routine has been described with reference to the transcription of messages that have been recorded on an endless-loop recorder. It will be recognized that a similar routine may be carried out for the transcription of messages, one-at-a-time, from a magnetic tape cassette. That is, only one of several messages recorded on a tape cassette is accorded the "assigned" status when that message is in position for transcription. The remaining messages which have not yet been transcribed from that cassette may continue to exhibit the "ready" status.

Also, although the preassignment routine has been described in conjunction with the connection of a transcribe station to preselected endless-loop recorders, it will be appreciated that, if desired, the recorders to which each transcribe station is connected need not be limited solely to the endless-loop type. For example, the recorders may be of a recorder-changer type wherein a supply of magnetic tape cassettes having messages thereon are supplied, individually, and one-at-a-time, to a transcribe station from which the recorded messages are transcribed.

Still further, the routines described herein need not be limited solely for application to central dictation systems. It is contemplated that these routines may be used with information processing systems in general, to recover information that has been stored in the system.

It is intended that the appended claims be interpreted as including the foregoing as well as other such changes and modifications.

What is claimed is:

1. In an information processing system having plural recorders on which information jobs are recorded and at least one recovery station connectable to said recorders for recovering information jobs therefrom, apparatus for connecting said at least one recovery station to preselected ones of said recorders in succession to recover the information jobs therefrom, comprising storage means for storing indications of said preselected recorders to which said at least one recovery station is to be connected; criteria establishing means for establishing the criteria on which said at least one recovery station is to be connected to said preselected recorders; selecting means for selecting one of said preselected recorders in accordance with the established criteria; connecting means for connecting said at least one recovery station to the selected recorder for recovering information jobs therefrom; and advancing means responsive to the completed recovery of information jobs for advancing said selecting means to select the next preselected recorder in accordance with said established criteria.

2. The apparatus of claim 1 wherein said criteria establishing means comprises backlog means for establishing backlog as the criterion on which said at least one recovery station is connected to a recorder, whereby the one of said preselected recorders having the greatest quantity of information jobs awaiting recovery is detected.

3. The apparatus of claim 2 wherein said selecting means comprises detecting means for detecting said one of said preselected recorders having the greatest backlog of information jobs awaiting recovery.

4. The apparatus of claim 3 wherein said detecting means comprises means for sequentially sensing the backlog of each of said preselected recorders; and means for indicating which of said preselected recorders has the greatest backlog.

5. The apparatus of claim 4 wherein said means for indicating comprises means for designating an initial "backlog level", means for determining if the actual sensed backlog of a recorder exceeds said initial "backlog" level and, if it does, for designating said actual sensed backlog as the "backlog level", means for identifying the recorder whose backlog is equal to said "backlog level", and means for determining if the actual sensed backlog of the next recorder exceeds said "backlog level".

6. The apparatus of claim 1 wherein said criteria establishing means comprises sequence means for establishing the sequence of preselection as the criterion on which said at least one recovery station is connected to a recorder.

7. The apparatus of claim 6 wherein said selecting means comprises detecting means for detecting the stored indication of the first of said preselected recorders; and clear means responsive to the connection of said at least one recovery station to said first of said preselected recorders to clear the indication thereof from said storage means, whereby the next indication of said preselected recorders is next detected as the indication of the first of said preselected recorders.

8. The apparatus of claim 1 wherein said advancing means comprises means for clearing from said storage means the indication of the recorder to which said at least one recovery station is connected; means for sensing the recovery of all of the information jobs from said recorder to which said at least one recovery station is connected; and means responsive to the recovery of all of said information jobs for enabling said selecting means to select the next recorder, in accordance with said established criteria, having an indication stored in said storage means.

9. The apparatus of claim 1 wherein said advancing means comprises means for clearing from said storage means the indication of the recorder to which said at least one recovery station is connected; means establishing predetermined characteristics of the information jobs to be recovered from said recorders, means for sensing the recovery from said recorder to which said at least one recovery station is connected of all of those information jobs satisfying said predetermined characteristics; and means responsive to the recovery of all of those information jobs satisfying said predetermined characteristics for enabling said selecting means to select the next recorder, in accordance with said established criteria, having an indication stored in said storage means.

10. The apparatus of claim 1 further comprising display means for displaying, for said at least one recovery station, said preselected recorders having indications stored in said storage means and said criteria on which said at least one recovery station is to be connected thereto.

11. In a central dictation system having plural recorders on which dictated messages are recorded and plural transcribe stations connectable to said recorders for transcribing messages therefrom, apparatus for connecting said transcribe stations to preselected ones of said recorders in succession to transcribe the messages therefrom, comprising storage means for storing, for each transcribe station, indications of the preselected recorders to which a respective transcribe station is to be connected; selecting means for selecting one of said preselected recorders to which said respective transcribe station is to be connected; connecting means for connecting said respective transcribe station to the selected recorder for transcribing messages therefrom; and advancing means responsive to the completed transcription of messages from said selected recorder for advancing said selecting means to select another one of said preselected recorders for connection to said respective transcribe station.

12. The apparatus of claim 11 wherein said storage means includes means for storing predetermined characteristics associated with the messages recorded on said plural recorders; and wherein said advancing means includes means for sensing if all of the messages recorded on said selected recorder and having said associated predetermined characteristics have been transcribed before advancing said selecting means to select another of said preselected recorders.

13. The apparatus of claim 12 wherein said predetermined characteristics include the times at which the dictated messages are entered into said central dictation system, and said means for sensing is operative to sense if said times are earlier than a predetermined time.

14. The apparatus of claim 12 wherein said predetermined characteristics include the times at which the dictated messages are entered into said central dictation system, and said means for sensing is operative to sense if said times are later than a predetermined time.

15. The apparatus of claim 11 wherein said selecting means comprises means for selecting individual ones of said preselected recorders in sequence.

16. The apparatus of claim 15, including manually operable means for designating those recorders to which a respective transcribe station is to be connected and the sequence of connection.

17. The apparatus of claim 16 wherein said storage means includes, for each transcribe station, addressable storage locations responsive to the operation of said manually operable means for storing said indications of those recorders to which said respective transcribe station is to be connected.

18. The apparatus of claim 17 wherein said selecting means further includes address means for addressing said storage means to read out sequentially therefrom the stored indications of said recorders.

19. The apparatus of claim 11 wherein said selecting means comprises means for selecting the one of said preselected recorders having the greatest backlog of messages awaiting transcription.

20. The apparatus of claim 19 wherein said storage means includes, for each transcribe station, addressable storage locations for storing said indications of those preselected recorders to which said respective transcribe station is to be connected, and means for storing data representing the backlog of those preselected recorders.

21. The apparatus of claim 20 wherein said means for selecting the one of said preselected recorders having the greatest backlog comprises address means for addressing said storage means and said means for storing data to read out sequentially therefrom the stored indications of recorders and stored data representing backlog, means for indicating the recorder having the greatest backlog, an means for designating said indicated recorder as the one recorder to which said respective transcribe station is to be connected.

22. The apparatus of claim 21 wherein said means for indicating the recorder having the greatest backlog comprises means for setting an initial backlog level, means for determining if the data representing backlog of a recorder whose indication is read out from said storage means exceeds said initial backlog level and, if so, to update the backlog level with this value, means for comparing the data representing backlog of a recorder whose indication subsequently is read out from said storage means to said backlog level and updating said backlog level only if said data exceeds said backlog level, means for holding the address of the location from which the recorder indication was read whose backlog data was the last to update said backlog level, and means for selecting the recorder whose indication is stored at the location corresponding to the held address.

23. The apparatus of claim 21 wherein said advancing means includes means for clearing from said storage means the stored indication of said recorder designated as said one recorder to which said respective transcribe station is to be connected.

24. The apparatus of claim 11, further including status designating means for designating the status of the messages recorded on said selected recorder, comprising "ready" designating means for designating "ready" status to messages awaiting transcription, "completed" designating means for designating "completed" status to messages which have been transcribed, detecting means for detecting when a message on said selected recorder is in position to be transcribed, "ready" sensing means for sensing if the message in position to be transcribed is a "ready" status designated message, "assign" designating means for changing over the status with which this message is designated to "assigned" status and for indicating the transcribe station to which this message has been assigned, and means for storing data related to said messages recorded on said selected recorder, including the status designations of said messages.

25. The apparatus of claim 24 wherein said status designating means further includes means for changing over the status of a message from "assigned" status to "ready" status when a different message on said recorder is in position to be transcribed prior to the completed transcription of the "assigned" status designated message.

26. The apparatus of claim 25 wherein said means for changing over the status of a message from "assigned" status to "ready" status comprises means responsive to said detecting means for reading out from said means for storing the data related to the "assigned" status designated message that had not been completely transcribed, means for deleting from said data the indication of the transcribe station to which said "assigned" status designated message had been assigned, and change-over means for changing over the status of said "assigned" status designated message to "ready" status and for supplying to said means for storing the data related to this changed status message.

27. In an information processing system having plural recorders, each of which having a plurality of information jobs recorded thereon, and plural recovery stations connectable to said recorders for recovering information jobs therefrom, apparatus for monitoring and storing data related to said information jobs, including the status of the information jobs recorded on each recorder, said status including the "ready" status designation representing those information jobs which are ready to be assigned to a recovery station for recovery from said recorder, the "assigned" status designation representing the information job which has been assigned to a recovery station, and the "completed" status designation representing those information jobs which have been completely recovered from said recorder, said apparatus comprising detecting means for detecting a change in the information job that is positioned in said recorder for recovery therefrom; "ready" sensing means for sensing if the changed information job is a "ready" designated job; retrieval means for retrieving data related to the sensed "ready" designated information job; status change-over means for changing the status of said "ready" designated information job to "assigned" status; and means for adding to the retrieved data related to said sensed information job the identification of the recovery station connected to said recorder.

28. The apparatus of claim 27 further comprising means for sensing the incomplete recovery of an "assigned" designated information job from said recorder; and means for causing said status change-over means to change the status of said incompletely recovered information job from "assigned" status to "ready" status and for deleting from the data related to said incompletely recovered information job the identification of the recovery station connected to said recorder.

29. The apparatus of claim 28 wherein said means for sensing the incomplete recovery of an "assigned" designated information job comprises "assigned" sensing means responsive to the detected change in the information job that is positioned for recovery from said recorder for sensing if the previous information job that had been positioned for recovery is an "assigned" designated job.

30. In a central dictation system having plural recorders, each containing a record medium having a plurality of dictated messages recorded thereon, and plural transcribe terminals, each connectable to an individual one of said recorders for transcribing the recorded messages from said record medium, apparatus for monitoring and storing data related to said messages, including the status of each message, said status including the "ready" status designating those messages on said record medium which are ready to be assigned for transcription, the "assigned" status designating the message on said record medium which has been assigned for transcription by the transcribe terminal connected to said recorder, and the "completed" status designating those messages on said record medium that have been completely transcribed, said apparatus comprising detecting means for detecting the positioning of a fresh message on said record medium for transcription; "ready" sensing means for sensing if the fresh message is a "ready" designated message; status change-over means responsive to said "ready" sensing means for changing the status data of said fresh message to the "assigned" status; and data modifying means for adding to the data associated with said fresh message the identification of the transcribe terminal that has been connected to said recorder for the transcription of said fresh message.

31. The apparatus of claim 30 wherein said detecting means includes means for detecting the positioning of a different message on said record medium for transcription before said fresh message is completely transcribed; and wherein said status change-over means includes means responsive to the detected positioning of a different message on said record medium for transcription for changing the status data of said fresh message to the "ready" status; and wherein said data modifying means includes means responsive to the detected positioning of a different message on said record medium for transcription for deleting from said data associated with said fresh message said identification of said transcribe terminal.

32. The apparatus of claim 31 wherein said detecting means comprises means for detecting the positioning of a new message on said record medium for transcription, means for sensing a first flag condition, and "assigned" sensing means responsive to said first flag condition for sensing if the preceding message is an "assigned" designated message; said first flag condition being established when the status data of said preceding message is changed to the "assigned" status.

33. The apparatus of claim 32, further including means for establishing a second flag condition when the positioning of a new message on said record medium for transcription is detected.

34. The apparatus of claim 33 wherein said detecting means further includes means for detecting no change in the message on said record medium positioned for transcription, and means for sensing said second flag condition, thereby detecting the positioning of a fresh message for transcription if no change in the message on said record medium has been detected and said second flag condition has been sensed.

* * * * *